(12) United States Patent
Yoshiura et al.

(10) Patent No.: US 7,345,443 B2
(45) Date of Patent: Mar. 18, 2008

(54) MOTOR CONTROL APPARATUS

(75) Inventors: Yasufumi Yoshiura, Fukuoka (JP); Yasuhiko Kaku, Fukuoka (JP); Keisei Inoki, Fukuoka (JP); Wennong Zhang, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/594,446

(22) PCT Filed: Mar. 24, 2005

(86) PCT No.: PCT/JP2005/005381

§ 371 (c)(1),
(2), (4) Date: Sep. 26, 2006

(87) PCT Pub. No.: WO2005/093939

PCT Pub. Date: Oct. 6, 2005

(65) Prior Publication Data
US 2007/0210731 A1 Sep. 13, 2007

(30) Foreign Application Priority Data
Mar. 26, 2004 (JP) .................. P.2004-091351

(51) Int. Cl.
*H02P 7/18* (2006.01)
*G05B 13/02* (2006.01)

(52) U.S. Cl. .................. 318/432; 318/437; 318/561; 318/608; 318/632

(58) Field of Classification Search ........ 318/432–434, 318/437, 448, 560–561, 565, 606–611, 619, 318/621–623, 632, 648; 388/902, 909
See application file for complete search history.

(56) References Cited

U.S. PATENT DOCUMENTS 5,418,440 A * 5/1995 Sakaguchi et al. .......... 318/560

(Continued)

FOREIGN PATENT DOCUMENTS

JP 9-93972 A 4/1997

(Continued)

OTHER PUBLICATIONS

Isogai et al., "Application of an Observer to a Motor Control System", 19th SICE proceeding, pp. 371-372, (1980).

(Continued)

Primary Examiner—Bentsu Ro
(74) Attorney, Agent, or Firm—Sughrue Mion, PLLC

(57) ABSTRACT

It is an object of the invention to provide a motor control apparatus capable of ensuring a control function even for a large inertia moment ratio.

In a motor control apparatus including a position detecting portion (1B) of a motor (18) for driving a mechanism a moment of inertia of which is unknown, a speed calculating portion (1C), a position control portion (15) for outputting a speed reference by inputting a difference between a position reference and a position of the motor, a speed control portion (16) for inputting a difference between the speed reference and a speed of the motor, a torque control portion (17) for controlling a torque of the motor from a torque reference, and an inertia variation restraining portion (13) for outputting the torque reference by predicting a disturbance of the motor from the torque reference and the speed of the motor, the motor control apparatus further includes a phase compensating portion (14) for inputting the speed reference and inputting a speed advancing a phase to the speed control portion as a new speed reference, regards the torque of the motor generated by a deviation in a set value with regard to an actual moment of inertia as a disturbance and compensates for the disturbance by the inertia variation restraining portion (13) and the phase compensating portion (14).

23 Claims, 22 Drawing Sheets

U.S. PATENT DOCUMENTS

| | | | | |
|---|---|---|---|---|
| 5,467,004 A | * | 11/1995 | Matsuo et al. | 318/807 |
| 5,734,242 A | * | 3/1998 | Iwashita | 318/434 |
| 5,834,917 A | * | 11/1998 | Yasui et al. | 318/568.11 |
| 2003/0097193 A1 | * | 5/2003 | Makino et al. | 700/42 |
| 2003/0179004 A1 | * | 9/2003 | Fukusumi et al. | 324/713 |

FOREIGN PATENT DOCUMENTS

| JP | 10-248286 A | 9/1998 |
|---|---|---|
| JP | 10-295092 A | 11/1998 |
| JP | 2001-249720 A | 9/2001 |
| JP | 2002-229605 A | 8/2002 |
| WO | WO 00/70739 A1 | 11/2000 |

OTHER PUBLICATIONS

Oishi et al., "A Control Method of a Separately Excited Direct Current Machine Using a Stage Observer", Electric Society Proceeding, B45, pp. 373-379, (1984).

M. Nakao et al., "A Robust Decentralized Joint Control Based on Interference Extimation", IEEE Trans. Industrial Electronics, IE-34, pp. 326-331, (1987).

Tsutomu Miashita et al., "A Tuningless Control of a Motor", pp. 47-52, (2000).

* cited by examiner

MOTOR CONTROL APPARATUS

TECHNICAL FIELD

The present invention relates to a control apparatus for controlling a motor.

RELATED ART

In a motor control apparatus, normally, as shown by FIG. 15(a), a speed control system 20 is integrated to an outer side of a torque (thrust) control portion 17 (details of a control system of which are not illustrated), and a position control system including a position control portion 15 is integrated to an outer side of the speed control system 20. The speed control system 20 includes a speed control portion 16 for generating a torque (thrust) reference based on a deviation between a speed reference and a speed of a motor, the torque (thrust) control portion 17, the motor 18, a drive portion 19 of a gear or the like, a load 1A, a position detecting portion 1B for detecting a position of the motor 18, and a speed calculating portion 1C for calculating the motor speed based on a position signal from the position detecting portion 1B. Further, numerals 101, 102 designate subtractors for generating deviations of respective signals.

In order to stabilize a characteristic of the position control system, it is necessary that a characteristic of the speed control system 20 is not varied but is stabilized.

Although in order to stabilize the speed control system 20, it is necessary that a speed gain is not varied, there is a case in which a value of a moment of inertia of the load 1A driven by the motor 18 necessary for calculating the speed gain is unknown or varied. Since a moment of inertia of the motor 18 is known, normally, the speed gain is frequently calculated by including the value of the moment of inertia of the load 1A by setting a moment of inertia ratio to the speed control system 20 of the motor control apparatus of the motor 18.

When a moment of inertia of the drive portion 19 of a machine attached with the motor 18 and the load 1A of rotating shaft conversion (moving direction conversion) is designated by notation $J_L$, and a moment of inertia of a rotor of the motor (moment of inertia of a moving element) is designated by notation $J_m$, a moment of inertia (inertia mass) ratio $J_{ratio}$ becomes as follows.

$$J_{ratio}=J_L/J_m \qquad (1)$$

Although an explanation has been given of a rotating type motor as the motor, a content of the explanation stays the same also in a linear motor and therefore, for convenience of the explanation, a term particular to the linear motor as in the moment of inertia (inertia mass) is represented by (*).

The speed control system of FIG. 15(a) can be realized as shown by FIG. 15(b). In the drawing, a block of 1/(Js) signifies the motor, an input thereof is a torque and an output thereof is a motor speed. Notation J designates a sum of the moment of inertia (inertia mass) $J_L$ of the load and the moment of inertia (inertia mass) $J_m$ of the motor.

When the moment of inertia ratio is used in an inertia setting portion, a forward gain becomes as follows from Equation (1), $$K_v \times J_m(1+J_{ratio})=K_v(J_m+J_L)=K_v \times J \qquad (2)$$

the forward gain including the motor becomes as follows, $$K_v \times J(1/(Js))=K_v/s \qquad (3)$$

by accurately setting the moment of inertia ratio, a speed loop gain $K_v$ can be determined. However, in a case in which the moment of inertia of the machine of the load is unknown or a case in which even when the moment of inertia is known, the moment of inertia is varied significantly, J (calculated value) of a numerator of Equation (3) and Js (physical amount of the machine) of a denominator are not the same and therefore, the speed gain $K_v$ is varied from a rectified value.

Although there is also a method of identifying the moment of inertia (inertia mass) ratio when the moment of inertia (inertia mass) of the load is unknown, when moving by a small amount (for example, in moving by, for example, about 100 pulses), the moment of inertia (inertia mass) ratio cannot be identified, a balance of the gain of the control system is deteriorated, the control system becomes unstable and there is a case of resonating the control system.

Hence, there has been conceived a disturbance suppressing control using a disturbance observer instead of identifying the moment of inertia (inertia mass) ratio. It has been presented in an academic society or the like about ten years ago that when the control is applied, there is achieved a control function equivalent to that when a correct moment of inertia ratio (moment of inertia ratio in which a moment of inertia calculated by calculation substantially coincides with an actual moment of inertia ratio) without identifying the moment of inertia. For example, Isogai et al "Application of an Observer to a Motor Control System" 19th SICE proceeding, 1980, p. 371-372 proposes that an influence of disturbance is reduced by constituting "disturbance suppressing control system" reducing the influence of disturbance effected on a motor by feeding back a disturbance of a motor predicted by a same dimensional disturbance observer of a second degree system (which is detected as a current value in correspondence with the disturbance).

Thereafter, Oishi et al, "A Control Method of a Separately Excited Direct Current Machine Using a State Observer" electric Society proceeding, 1984, B45 p. 373-379 proposes a method of constituting one degree system of a minimum dimensional disturbance observer for predicting a load torque.

Further, M. Nakao, et al, "A ROBUST DECENTRALIZED JOINT CONTROL BASED ON INTERFERENCE EXTIMATION" IEEE Trans. Industrial Electronics, 1987, IE-34 p. 326-331 shows that a variation in a characteristic of a control system by a variation in a moment of inertia can be reduced by a disturbance suppressing control using one degree system of minimum dimensional disturbance observer, there is provided a result that even when a load moment of inertia is varied by 1.7 times, the control system is robust (which signifies that a variation in a characteristic is small), Miyashita et al, "A Tuningless Control of a Motor", 2000, p. 47-52 shows that a control system stays to be robust regardless of a variation in a moment of inertia of 10 times, by which Patent Reference 1 has been filed as a related patent.

Patent Reference 1 is characterized in that when a machine system of inertia much larger than that of a motor torque is driven, by carrying out a disturbance suppressing control by using a disturbance observer, the moment of inertia of the machine system in view from a speed control portion is controlled to be small apparently.

Patent Reference 1: JP-A-10-248286

Patent Reference 2: JP-A-2002-229605

DISCLOSURE OF THE INVENTION

Problems that the Invention is to Solve

Although not clearly described in Patent Reference 1, according to the above-described reference of Miyashita et al, there poses a problem that according to the disturbance suppressing control method of the conventional art, only the control function up to about 10 times in the moment of inertia ratio can be ensured.

There is constituted a disturbance suppressing control by using one degree of disturbance observer as shown by FIG. 16 similar to the reference of Miyashita et al. According thereto, an inertia variation restraining portion 13 indicated by a broken line is added between the speed control portion 16 and the torque (thrust) control portion 17. The inertia variation restraining portion 13 includes a disturbance observer 10 for calculating a disturbance element based on the speed of the motor and the torque (thrust) reference, and the torque control portion 17 for multiplying an output thereof by a gain 12 to add to the torque (thrust) reference as an estimated disturbance torque (thrust) (adder 103) to output as a new torque (thrust) reference.

FIG. 17 shows an example of a result of simulating the speed of the motor by a computer by using the inertia variation restraining portion 13 in this way. A graph (a) of FIG. 17 shows a case in which the moment of inertia ratio is 0 times (motor per se and the gain is adjusted to bring about a stable response. When the moment of inertia ratio is made to be 10 times as it is, a response of a graph (b) of FIG. 17 is brought about, when attention is paid to a waveform immediately after a rotational speed of the motor is changed from an accelerated speed to an equal speed and a waveform immediately after the rotational speed is changed from a decelerated speed to zero speed, a response substantially equivalent to that of 0 times thereof is maintained. When the moment of inertia is made to be 25 times, as shown by a graph (c) of FIG. 17, the graph is vibrated and the control system becomes unstable.

As is known from the example, according to the method of the conventional art, it is known that the response can stably be controlled only up to about 10 times of the moment of inertia ratio.

Further, in the normal position control system of FIG. 15(a) or the position control system combined with the disturbance suppressing control shown in FIG. 16, feed forward is frequently added in order to shorten a positioning time period after the position gain is increased to an upper limit. Here, FIG. 16 is made to constitute a control block diagram of a first conventional art.

FIG. 20 is control block diagram of a second conventional art. For example, as shown by the drawing, speed feed forward can be combined with the position control system combined with the disturbance suppressing control which is the first conventional art. In the drawing, a speed feed forward signal is added to a speed reference which is an output of the position control portion 15 from the position reference by way of a speed FF portion 1D. Further, in the following explanation (particularly drawing), speed forward may be abbreviated as FF. Normally, the speed FF portion 1D is constituted by using a differentiator or an approximate differentiator (constituted by combining a low pass filter and a differentiator or a high pass filter).

FIG. 21 shows a response (computer simulation result) in positioning operation when a speed FF gain (not illustrated) at inside of the speed FF portion 1D is set to 90% in the second conventional art. In the drawing, there is shown a speed waveform of the motor when the moment of inertia ratio is increased (2 times, 10 times) by increasing the moment of inertia (inertia mass) ratio of the load while the speed waveform of the motor when the correct moment of inertia (inertia mass) ratio is set to the speed control portion 16 and the speed control portion 16 are set as they are. Further, a position reference speed signifies a speed component constituted by differentiating the position reference. When there is not a time lag in the response of the position control system, the speed of the motor coincides with the position reference speed.

When compared with the result of FIG. 17, although the response is accelerated by an effect of the feed forward when the moment of inertia ratio is 0 times, 2 times, when the moment of inertia ratio is 10 times, a waveform immediately after the motor speed is changed from an accelerated speed to an equal speed or immediately after the motor speed is changed from a decelerated speed to zero speed is vibrated and the control system becomes unstable. That is, it is known that when speed FF is applied, the robust range regardless of the variation in the moment of inertia is deteriorated from 10 times to about 2 times.

FIG. 22 is a control block diagram of a third conventional art. In order to shorten the positioning time period, as shown by the drawing, speed FF and torque FF are frequently added to the position control system combined with the disturbance restraining control constituting the first conventional art. In the drawing, the speed reference constituting the output of the position control portion 15 is added with the speed FF signal by way of the speed FF portion 1D from an output of a reference filter portion 1F inputted with the position reference and is added to the torque reference by way of a torque FF portion 1E. The torque FF portion 1E can be realized by constituting 2 times differentiator connected in series with differentiators in 2 stages and connecting approximate differentiators in series in 2 stages.

FIG. 23 shows a response (computer simulation result) in positioning operation when a speed FF gain (not illustrated) at inside of the speed FF portion is set to 100% and a torque FF gain is set to 70%. In the drawing, there is shown a speed waveform of the motor when the moment of inertia ratio is increased (3 times, 10 times) by increasing the moment of inertia (inertia mass) of the load while the speed waveform of the motor when the correct moment of inertia (inertia mass) ratio is set to the speed control portion 16 and setting of the speed control portion 16 are made to stay as they are. Compared with the result of FIG. 17, although the response is accelerated by the effect of the feed forward when the moment of inertia ratio is 0 times, 3 times, when the moment of inertia ratio is 10 times, a waveform immediately after the motor speed is changed from an accelerated speed to an equal speed or immediately after the motor speed is changed from a decelerated speed to zero speed is vibrated, and the control system becomes unstable. That is, it is known that when speed FF and torque FF are applied, the robust range regardless of the variation in the moment of inertia is deteriorated from 10 times to about 3 times.

As described above, there poses a serious problem that when the feed forward is applied to the position control system of the conventional art applied with the inertia variation restraining portion 13, the robust range regardless of the variation in the moment of inertia is significantly deteriorated from 10 times to about 2 through 3 times of the conventional art. There poses a serious problem that when an allowable variation range of the moment of inertia is intended to be increased, it is necessary to reduce the feed forward effect, the positioning time period cannot be shortened, further, when the positioning time period is intended to be shorten sufficiently, the allowable variation range of the moment of inertia is about 2 through 3 times, an applicable range is narrowed and therefore, which is not practical.

The invention has been carried out in view of such a problem and it is an object thereof to provide a motor control apparatus capable of ensuring a control function even for a large moment of inertia ratio (inertia mass ratio).

Means for Solving the Problems

In order to resolve the above-described problem, according to a first constitution of the invention, there is provided a motor control apparatus including:

a position detecting portion for detecting a position of a motor for driving a mechanism a moment of inertia or an inertia mass of which is unknown, a speed calculating portion for outputting a speed of the motor by inputting an output of the position detecting portion, a position control portion for outputting a speed reference by inputting a difference between a position reference and the position of the motor, an inertia variation restraining portion for outputting a new torque reference by predicting a disturbance of the motor by inputting a torque reference and the speed of the motor, a torque control portion for controlling a torque of the motor by inputting the new torque reference, a phase compensating portion for outputting a new speed reference of advancing a phase by inputting the speed reference, and a speed control portion for outputting the torque reference by inputting a difference between the new speed reference and the speed of the motor.

According to a second constitution of the invention, there is provided the motor control apparatus in the first constitution, further including:

a phase compensating portion for outputting a new speed of advancing the phase by inputting the speed of the motor and the torque reference in place of the phase compensating portion, and a speed control portion for outputting the torque reference by inputting a difference between the speed reference and the new speed in place of the speed control portion.

According to a third constitution of the invention, there is provided the motor control apparatus in the first constitution, further including:

a first phase compensating portion for outputting a new speed reference of advancing the phase by inputting the speed reference in place of the phase compensating portion, a second phase compensating portion for outputting a new speed advancing the phase by inputting the speed of the motor and the torque reference, and a speed control portion for outputting the torque reference by inputting a difference between the new speed reference and the new speed in place of the speed control portion.

According a fourth constitution of the invention, there is provided the motor control apparatus in the second constitution, wherein the phase compensating portion includes a low pass filter and calculates a time constant of the low pass filter by a polynomial constituting an independent variable by a speed loop gain.

According to a fifth constitution of the invention, there is provided the motor control apparatus in the third constitution, wherein the second phase compensating portion includes a low pass filter and calculates a time constant of the low pass filter by a polynomial constituting an independent variable by a speed loop gain.

According to a sixth constitution of the invention, there is provided the motor control apparatus in the first constitution, wherein the phase compensating portion includes a low pass filter and calculates a cut off frequency of the low pass filter by a polynomial constituting an independent variable by a speed loop gain.

According to a seventh constitution of the invention, there is provided the motor control apparatus in the third constitution, wherein the first phase compensating portion includes a low pass filter and calculates a cut off frequency of the low pass filter by a polynomial constituting an independent variable by a speed loop gain.

According to an eighth constitution of the invention, there is provided a motor control apparatus including:

a position detecting portion for detecting a position of a motor for driving a mechanism a moment of inertia or an inertia mass of which is unknown, a speed calculating portion for outputting a speed of the motor by inputting an output of the position detecting portion, an inertia variation restraining portion for outputting a new torque reference by predicting a disturbance of the motor by inputting a torque reference and the speed of the motor, a phase compensating portion for outputting a new speed advancing a phase by inputting the speed of the motor and the torque reference, and a speed control portion for inputting the torque reference by inputting a difference between a speed reference and the new speed.

According to a ninth constitution of the invention, there is provided the motor control apparatus in the eighth constitution, wherein the phase compensating portion includes a low pass filter and calculates a time constant of the low pass filter by a polynomial constituting an independent variable by a speed loop gain.

According to a tenth constitution of the invention, there is provided a motor control apparatus including:

a position detecting portion for detecting a position of a motor for driving a mechanism a moment of inertia or an inertia mass of which is unknown, a speed calculating portion for outputting a speed of the motor by inputting an output of the position detecting portion, a position control portion for outputting a speed reference by inputting a difference between a position reference and the position of the motor, a speed feed forward portion for outputting a speed feed forward signal by inputting the position reference, an inertia variation restraining portion for outputting a new torque reference by predicting a disturbance of the motor by inputting a torque reference and the speed of the motor, a phase compensating portion for outputting a new speed reference advancing a phase by inputting a sum of the speed reference and the speed feed forward signal, and a speed control portion for outputting the torque reference by inputting a difference between the new speed reference and the speed of the motor.

According to an eleventh constitution of the invention, there is provided the motor control apparatus in the tenth constitution, further including:

a phase compensating portion for outputting a new speed advancing the phase by inputting the speed of the motor and the torque reference in place of the phase compensating portion, and a speed control portion for outputting the torque reference by inputting a difference between the sum of the speed reference and the speed feed forward signal and the new speed in place of the speed control portion.

According to a twelfth constitution of the invention, there is provided the motor control apparatus in the tenth constitution, further including:

a first phase compensating portion for outputting the new speed reference advancing the phase by inputting the sum of the speed signal and the speed feed forward signal in place of the phase compensating portion, a second phase compensating portion for outputting the new speed advancing the phase by inputting the speed of the motor and the torque reference, and a speed control portion for outputting the torque reference by inputting a difference between the new speed reference and the new speed in place of the speed control portion.

According to a thirteenth constitution of the invention, there is provided a motor control apparatus including:

a position detecting portion for detecting a position of a motor for driving a mechanism a moment of inertia or an inertia mass of which is unknown, a speed calculating portion for outputting a speed of the motor by inputting an output of the position detecting portion, a position control portion for outputting a speed reference by inputting a difference between a position reference and the position of the motor, a speed feed forward portion for outputting a speed forward signal by inputting the position reference, a torque feed forward portion for outputting a torque feed forward signal by inputting the position reference, an inertia variation restraining portion for outputting a new torque reference by predicting a disturbance of the motor by inputting a sum of a torque reference and the torque feed forward signal and the speed of the motor, a phase compensating portion for outputting a new speed reference advancing a phase by inputting a sum of the speed reference and the speed forward signal, and a speed control portion for outputting the torque reference by inputting a difference between the new speed reference and the speed of the motor.

According to a fourteenth constitution of the invention, there is provided the motor control apparatus in the thirteenth constitution, further including:

a phase compensating portion for outputting a new speed advancing the phase by inputting a sum of the torque reference and the torque feed forward signal and the speed of the motor in place of the phase compensating portion, and a speed control portion for outputting the torque reference by inputting a difference between a sum of the speed reference and the feed forward signal and the new speed in place of the speed control portion.

According to a fifteenth constitution, there is provided the motor control apparatus in the thirteenth constitution, further including:

a first phase compensating portion for outputting the new speed reference advancing the phase by inputting the sum of the speed reference and the speed feed forward signal in place of the phase compensating portion, a second phase compensating portion for outputting a new speed advancing the phase by inputting a sum of the torque reference and the torque feed forward signal and the speed of the motor, and a speed control portion for outputting the torque reference by inputting a difference between the new speed reference and the new speed in place of the speed control portion.

According to a sixteenth constitution of the invention, there is provided the motor control apparatus in the tenth constitution or the thirteenth constitution, wherein the phase compensating portion includes a low pass filter and calculates a cut off frequency of the low pass filter by a polynomial constituting an independent variable by a speed loop gain.

According to a seventeenth constitution of the invention, there is provided the motor control apparatus in the eleventh constitution or the fourteenth constitution, wherein the phase compensating portion includes a low pass filter and calculates a time constant of the low pass filter by a polynomial constituting an independent variable by a speed loop gain.

According to an eighteenth constitution of the invention, there is provided the motor control apparatus in the twelfth constitution or the fifteenth constitution, wherein the first phase compensating portion includes a low pass filter and calculates a cut off frequency of the low pass filter by a polynomial constituting an independent variable by a speed loop gain.

According to a nineteenth constitution of the invention, there is provided the motor control apparatus in the twelfth constitution or the fifteenth constitution, wherein the second phase compensating portion includes a low pass filter and calculates a time constant of the low pass filter by a polynomial constituting an independent variable by a speed loop gain.

ADVANTAGE OF THE INVENTION

According to the invention of the first constitution, it is not necessary to set the moment of inertia ratio even when a range of varying the moment of inertia of the load is widened to 1.5 times of that of the conventional art without changing a servo parameter and a servo function can be ensured.

According to the invention of the second constitution, it is not necessary to set the moment of inertia ratio even when the range of varying the moment of inertia of the load is widened to 2.5 times of that of the conventional art and the servo function can be ensured. Further, in comparison with the invention according to Claim 1, there is also achieved an effect of capable of shortening a positioning time period.

According to the invention of the third constitution, it is not necessary to set the moment of inertia ratio even when the range of varying the moment of inertia of the load is widened to 3 times of that of the conventional art and the servo function can be ensured.

Further, a waveform of a response the same as that in a case of setting an accurate moment of inertia ratio is constituted for a variation in an inertia and therefore, there is also achieved an effect of capable of carrying out an operation of a small deviation in a locus in controlling loci by a plurality of axes having different moment of inertia ratios.

According to the invention of the fourth constitution or the fifth constitution, by automatically changing the time constant of the low pass filter in the phase compensating portion as the function of the speed loop gain, there is achieved an effect of capable of changing the speed loop gain without care of a change in the servo function.

According to the invention of the sixth constitution or the seventh constitution, by automatically changing the cut off frequency of the low pass filter in the phase compensating portion as the function of the speed loop gain, there is achieved an effect of capable of changing the speed loop gain without care of the change in the servo function.

According to the invention of the eighth constitution, even when the motor control apparatus is operated as the speed control apparatus, there is achieved an effect similar to that when the motor control apparatus is operated as the position control apparatus without changing a servo parameter.

According to the invention of the ninth constitution, even when the motor control apparatus is operated as the speed control apparatus, by automatically changing the time constant of the low pass filter in the phase compensating portion as the function of the speed loop gain, there is achieved an effect of capable of changing the speed loop gain without care of the change in the servo function.

According to the invention of the tenth constitution or the eleventh constitution or the twelfth constitution, when speed feed forward is applied to the position control system, there is achieved a significant effect of capable of resolving the problem of making ensuring the robust range and speed-up of the response compatible which cannot be achieved by the conventional arts.

According to the invention of the thirteenth constitution or the fourteenth constitution or the fifteenth constitution, when speed feed forward and torque feed forward are applied to the position control system, there is achieved an significant effect of capable of resolving the problem of making ensuring the robust range and high speed formation of the response compatible which cannot be achieved by the conventional arts.

According to the invention of the sixteenth constitution or the eighteenth constitution, by automatically changing the cut off frequency of the low pass filter in the phase compensating portion as the function of the speed loop gain, there is achieved an effect of capable of changing the speed loop gain without care of the change in the servo function.

According to the invention of the seventeenth constitution or the nineteenth constitution, by automatically changing the time constant of the low pass filter in the phase compensating portion as the function of the speed loop gain, there is achieved an effect of capable of changing the speed loop gain without care of the change in the servo function.

Figure 1:
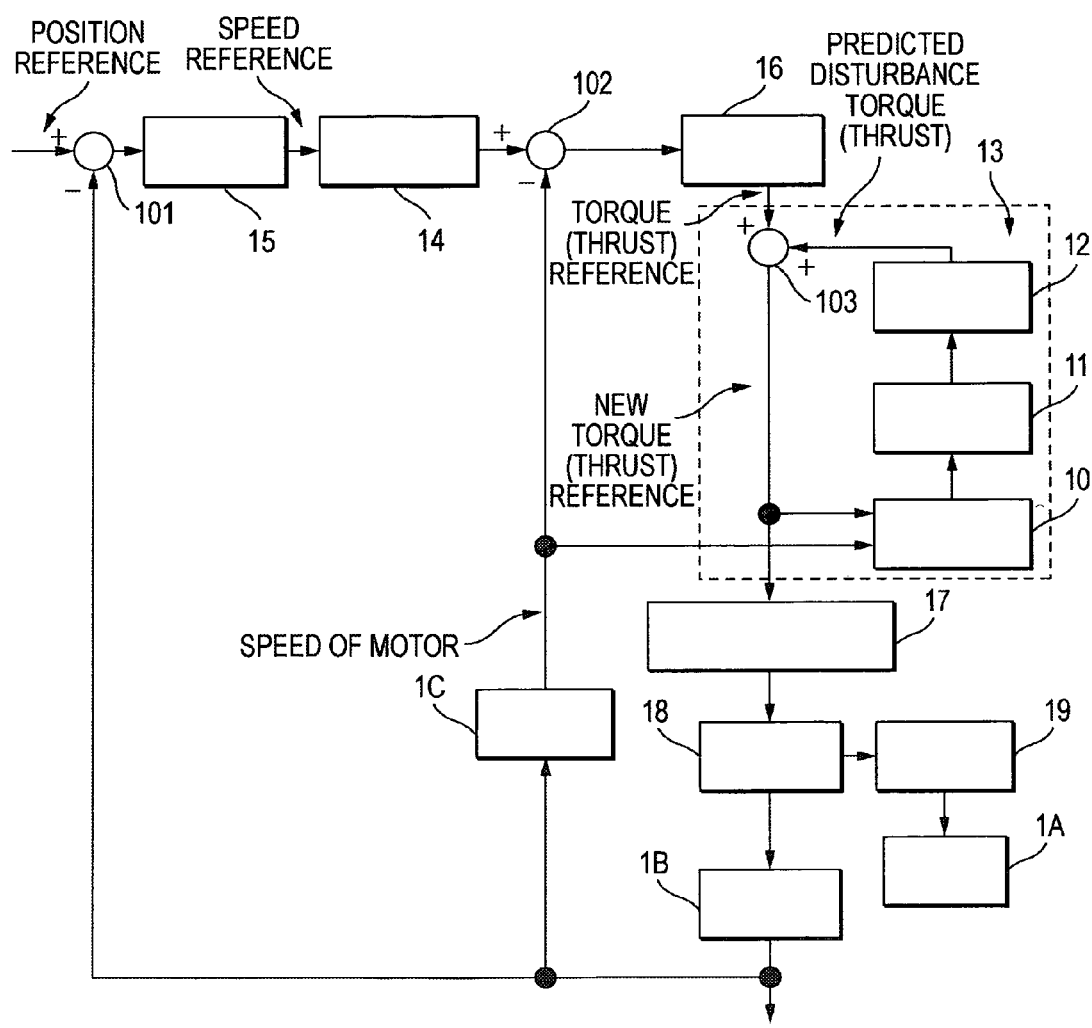
FIG. 1 is a control block diagram of Embodiment 1 of the invention.

DESCRIPTION OF REFERENCE NUMERALS AND SIGNS 10 disturbance observer
11 low pass filter
12 gain
13 inertia variation restraining portion
14 phase compensating portion
15 position control portion
16 speed control portion
17 torque (thrust) control portion of motor
18 motor
19 drive portion
20 speed control system
1A load
1B position detecting portion
1C speed calculating portion
1D speed feed forward portion
1E torque feed forward portion
1F reference filter portion
21 observer gain
22 observer integration gain
23 moment of inertia (inertia) correcting portion
24 integration calculating portion
31 observer gain
41 observer gain
42 observer gain
51 low pass filter
52 high pass filter
61 phase compensating portion
62 model of control object
63 controller
64 low pass filter
101 subtractor
102 subtractor
103 adder
104 subtractor
208 adder
209 subtractor

BEST MODE FOR CARRYING OUT THE INVENTION

Specific embodiments of a motor control apparatus according to the invention will be explained in reference to the drawings as follows.

Embodiment 1

FIG. 1 is a control block diagram showing a constitution of Embodiment 1 of the invention.

In FIG. 1, the motor control apparatus of Embodiment 1 includes a position control portion 15 for outputting a speed reference based on a deviation between a position reference and a motor position, a phase compensating portion 14 for carrying out phase compensation of the speed reference, a speed control portion 16 for generating a torque (thrust) reference based on a deviation between the speed reference the phase of which has been compensated for and a speed of a motor, an inertia variation restraining portion 13, a torque (thrust) control portion 17, a motor 18, a drive portion 19 of a gear or the like, a load 1A, a position detecting portion 1B for detecting a position of the motor 18, and a speed calculating portion 1C for calculating a motor speed based on a position signal from the position detecting portion 1B. The inertia variation restraining portion 13 includes a disturbance observer 10 for calculating a disturbance element based on the speed and the torque (thrust) reference of the motor, a low pass filter 11 for removing harmonics noise of an output thereof, and an adder 103 for multiplying an output thereof by a gain 12 to add to the torque (thrust) reference as a predicted disturbance torque (thrust) to be outputted as a new torque (thrust) reference.

According to the motor control apparatus having the above-described constitution, the motor 18 is driven by the torque (thrust) control portion 17 of the motor including a power amplifier (not illustrated). The motor 18 drives the drive portion 19 of a mechanism (not illustrated) and therefore, when the motor is a rotational drive motor, a moment of inertia of the motor 18 is added with a moment of inertia of a machine constituting the load 1A. When the motor is a linear motor, the inertia mass of the linear motor is added with the inertia mass of a machine constituting the load 1A. In the following, the motor is referred to as motor including the rotational drive motor and the linear motor (when differentiated, the motor is referred to as the rotational drive motor or the linear motor).

Further, although an explanation will be given as follows by taking an example of the rotational drive motor, when a torque is made to substitute for a thrust, the invention can be embodied quite similarly also in the case of a linear motor. Substitution of a term in the linear motor is expressed by attaching ( ) as in "torque (thrust)".

By detecting the position of the motor 18 by the position detecting portion 1B of an encoder, a linear scale or the like and inputting the output of the position detecting portion 1B to the speed calculating portion 1C, the speed is calculated from the detected position. A differentiator or the like may be used for the speed calculating portion 1C.

According to the invention, in order to resolve the problem of the conventional art, a normal speed control system is combined with the inertia variation restraining portion 13 and the phase compensating portion 14 as described below.

The speed reference is inputted to the phase compensating portion 14 and the output of the phase compensating portion 14 is made to constitute a new speed reference.

A difference between the new speed reference and a speed feed back signal is inputted to the speed control portion 16 and the output of the speed control portion 16 is inputted to the inertia variation restraining portion 13.

A speed control system can be constituted by inputting the output of the inertia variation restraining portion 13 to the torque (thrust) control portion 17 of the motor as a torque (thrust) reference.

Further, a position control system can be constituted by inputting a difference between the output of the position detecting portion 1B and the position reference and constituting the speed reference by the output of the position control portion 15.

As shown by FIG. 1, according to the inertia variation restraining portion 13, the motor speed is inputted to the disturbance observer 10, the output of the disturbance observer 10 is inputted to the low pass filter 11, an output constituted by multiplying the output of the low pass filter 11 by the gain 12 and the torque (thrust) reference constituting the output of the speed control portion 16 are added, the added output is inputted to the disturbance observer 10 as a new torque (thrust) reference and inputted to the torque (thrust) control portion 17 of the motor. Although the low pass filter 11 is not normally needed, the low pass filter 11 is made to function as a noise filter in an environment having large noise.

The disturbance observer 10 can be constituted as a publicly-known disturbance observer. For example, as shown by FIG. 2, the disturbance observer 10 may be constituted by a second degree disturbance observer.

Figure 2:
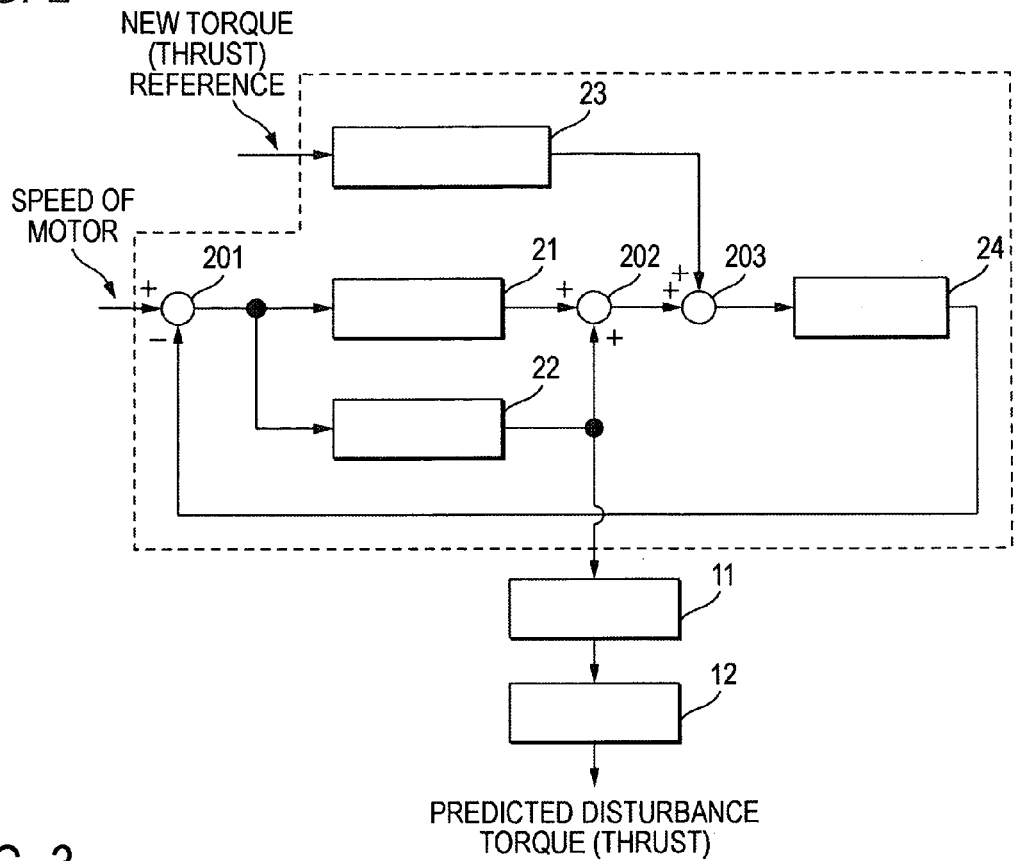
FIG. 2 is a control block diagram showing an example of an inertia variation restraining portion according to Embodiment 1.

According to the disturbance observer 10 of FIG. 2, a deviation between a speed of the motor and an output of an integration calculating portion 24 is multiplied by an observer gain 21 and an observer integration gain 22, a sum of outputs thereof and an output of a moment of inertia (inertia mass) correcting portion 23 is integrated by the integration calculating portion 24, a difference between the integrated value and the speed of the motor is calculated to be fed back. In the drawing, numeral 201 designates a subtractor, numerals 202, 203 designate adders.

Figure 3:
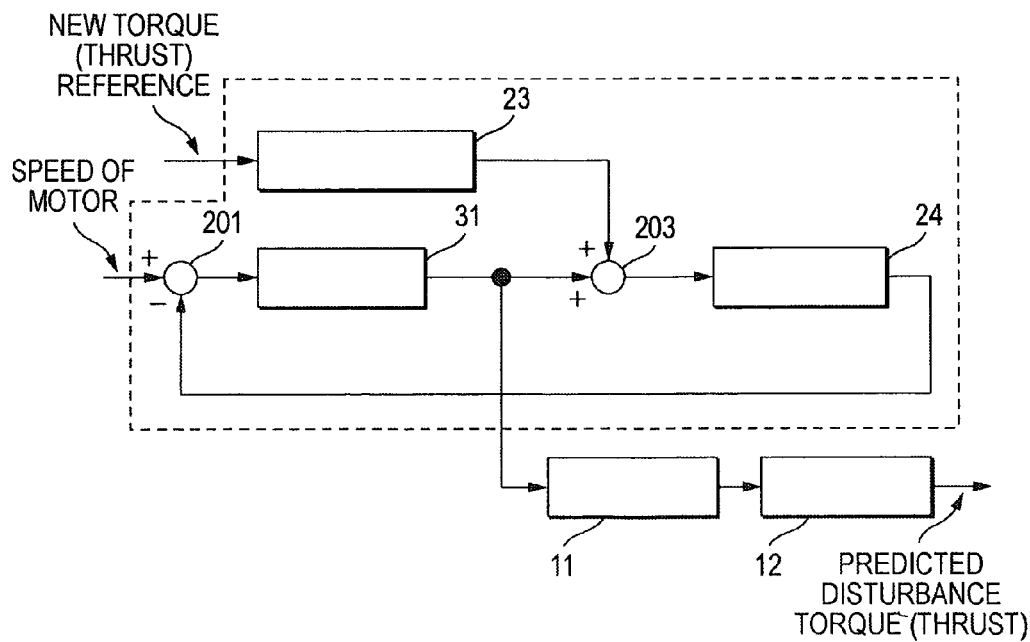
FIG. 3 is a control block diagram showing other example of an inertia variation restraining portion according to Embodiment 1.

Or, the disturbance observer 10 may be constituted by a first degree disturbance observer as shown by FIG. 3.

According to the disturbance observer 10 of FIG. 3, the deviation between the speed of the motor and the output of the integration calculating portion 24 is multiplied by an observer gain 31, a sum of an output thereof and the output of the moment of inertia (inertia mass) correcting portion 23 is integrated by the integration calculating portion 24, a difference between the integrated value and the speed of the motor is calculated to be fed back.

Figure 4:
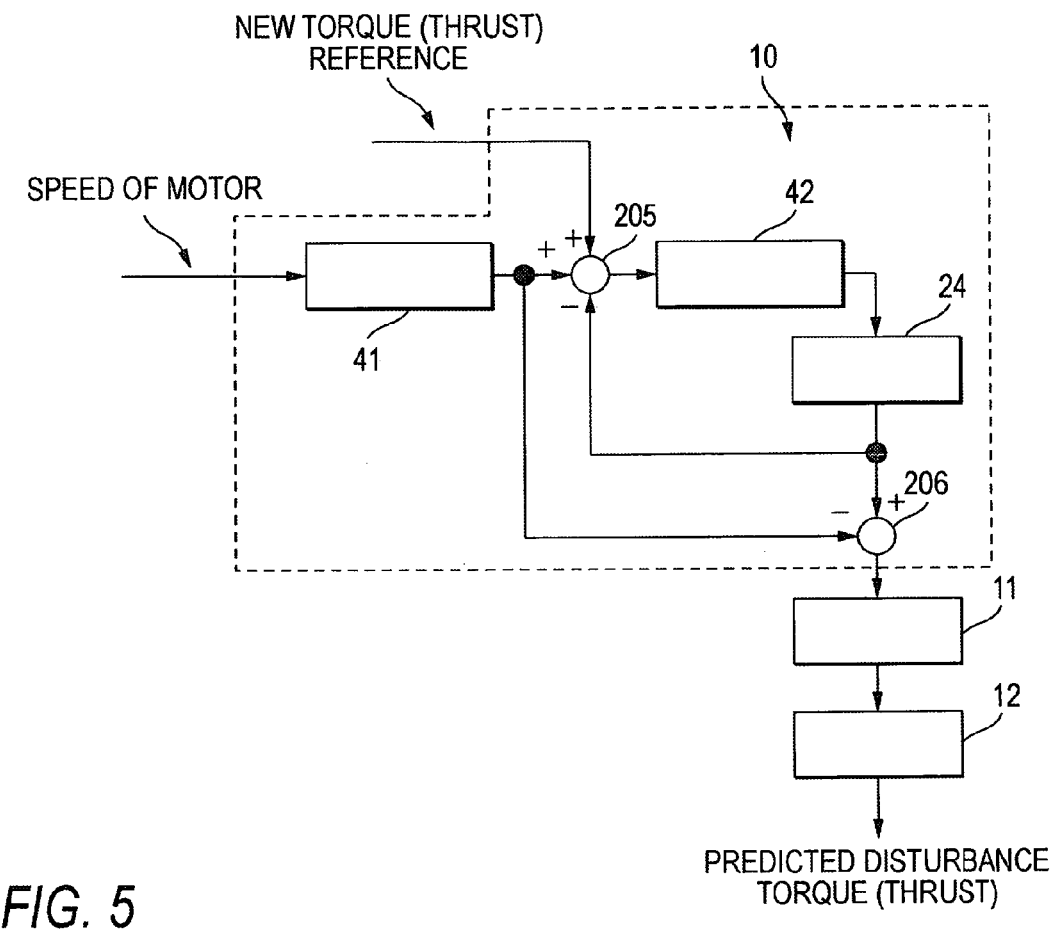
FIG. 4 is a control block diagram showing still other example of an inertia variation restraining portion according Embodiment 1.

Or, as shown by FIG. 4, the disturbance observer 10 may be constituted by other first degree disturbance observer.

According to the disturbance observer 10 of FIG. 4, the speed of the motor is multiplied by an observer gain 41, and the integration calculating portion 24 is inputted with a sum of an output thereof and a new torque (thrust) reference subtracted by the output of the integration calculating portion 24 and multiplied by an observer gain 42. A difference between the output of the integration calculating portion 24 and the output of the observer gain 41 is outputted to the low pass filter 11. In the drawing, numeral 205 designates an adder/subtractor, numeral 206 designates a subtractor.

Figure 5:
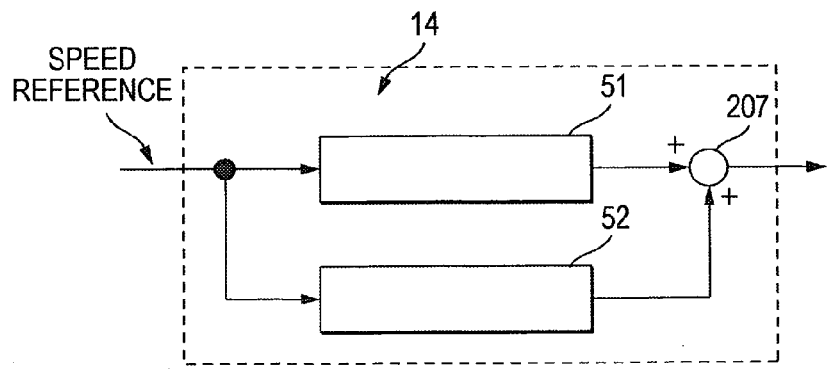
FIG. 5 is a control block diagram of a phase compensating portion according to Embodiment 1.

An object of the phase compensating portion according to the first embodiment or the first phase compensating portion according to the third embodiment resides in advancing a phase by a specific frequency range, the phase is not advanced only by the low pass filter, the phase is advanced even in an unnecessary low pass frequency band only by the high pass filter, further, by the high pass filter, a gain of a low frequency band compensated for by a speed loop gain or integration of a speed inherently is reduced. Therefore, for example, as shown by FIG. 5, the phase compensating portion 14 may be constituted by a control block using a phase advancing filter having a constitution of providing both of a low pass filter 51 and a high pass filter 52 and adding respective outputs thereof by an adder 207 to be outputted.

Generally, a transfer function G(s) of a phase advancing filter is expressed by Equation (8), and a phase lag can be improved by adjusting respective time constants such that a relationship between a time constant T1 of a low pass filter and a time constant T2 of a high pass filter becomes a condition of $1/T_2 < 1/T_1$, that is, a relationship between a cut off frequency $\omega_1 (=1/T_1)$ of the low pass filter and a cut off frequency $\omega_2 (=1/T_2)$ of the high pass filter becomes $\omega_2 < \omega_1$. When the condition is reversed, a phase lagging filter is constituted to nullify a phase advancing effect.

$$G(s) = (1 + sT_2)/(1 + sT_1) \quad (8)$$
$$= 1/(1 + sT_1) + sT_2/(1 + sT_1)$$
$$= \omega_1/(\omega_1 + s) + T_2\omega_1 s/(\omega_1 + s)$$

Further, the constitution of the phase advancing filter can also be written as shown by Equation (9) as follows.

$$G(s) = \omega_1/(\omega_1+s) + T_2\omega_1 s/(\omega_2+s) \quad (9)$$

At this occasion, by making the cut off frequency of the low pass filter 51 larger than the cut off frequency of the high pass filter 52, the phase advancing filter is constituted.

Figure 6:
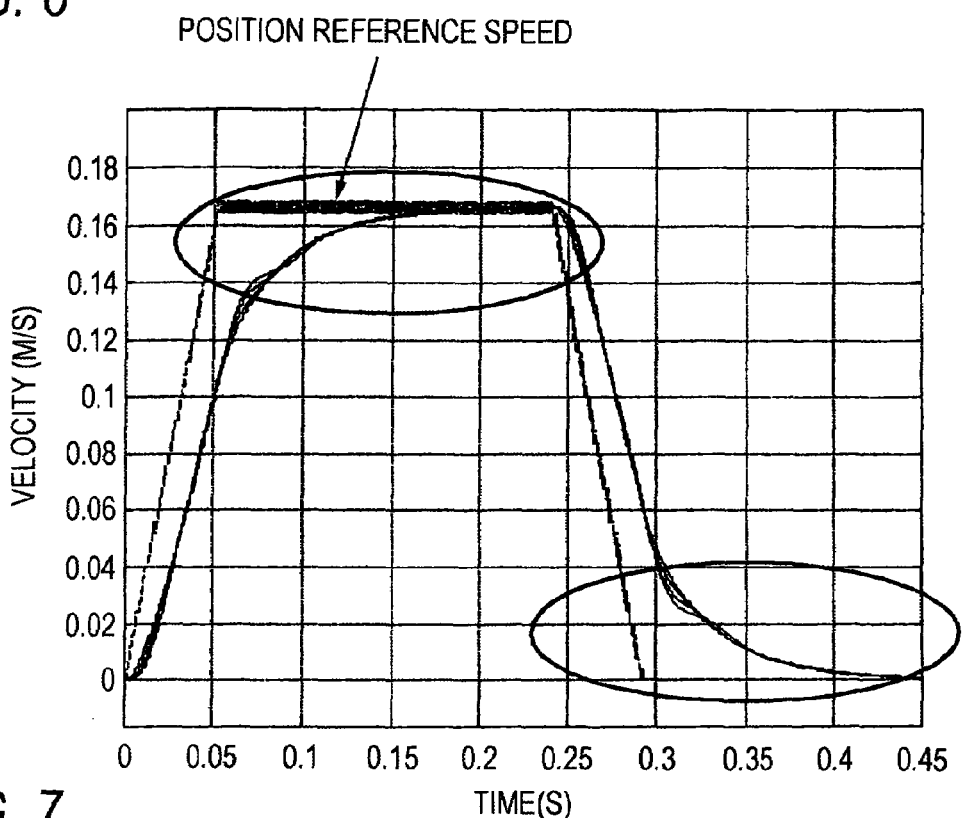
FIG. 6 is a graph showing a response of a position control system using both of a first degree disturbance observer and a phase advancing filter according to Embodiment 1.

FIG. 6 shows a computer simulation result when the inertia variation restraining portion is constituted by the first degree disturbance observer and the phase advancing filter is made to constitute the phase compensating portion.

FIG. 6 shows the speed of the motor when the speed control portion is set with a correct moment of inertia (inertia mass) ratio and the speed of the motor when the moment of inertia (inertia mass) ratio is 0 times, 5 times, 10 times, 15 times according to the constitution of the embodiment (computer simulation result). When a waveform immediately after the speed of the motor is changed from an accelerated speed to an equal speed and a waveform immediately after the motor speed is changed from a decelerated speed to a zero speed in the drawing (portions surrounded by ellipses in the drawing), all of the graphs when the moment of inertia (inertia mass) ratio is 0 times, 5 times, 10 times, 15 times are overlapped to constitute substantially the same response.

That is, according to the embodiment, the inertia variation can be compensated for up to 15 times of the moment of inertia (inertia mass) ratio and a robust performance is promoted by 1.5 times as much as that of the conventional art.

Therefore, according to the embodiment, the control system can be stabilized up to the moment of inertia (inertia mass) ratio wider than that of the conventional art and the positioning response becomes constant regardless of the load.

Embodiment 2

Figure 7:
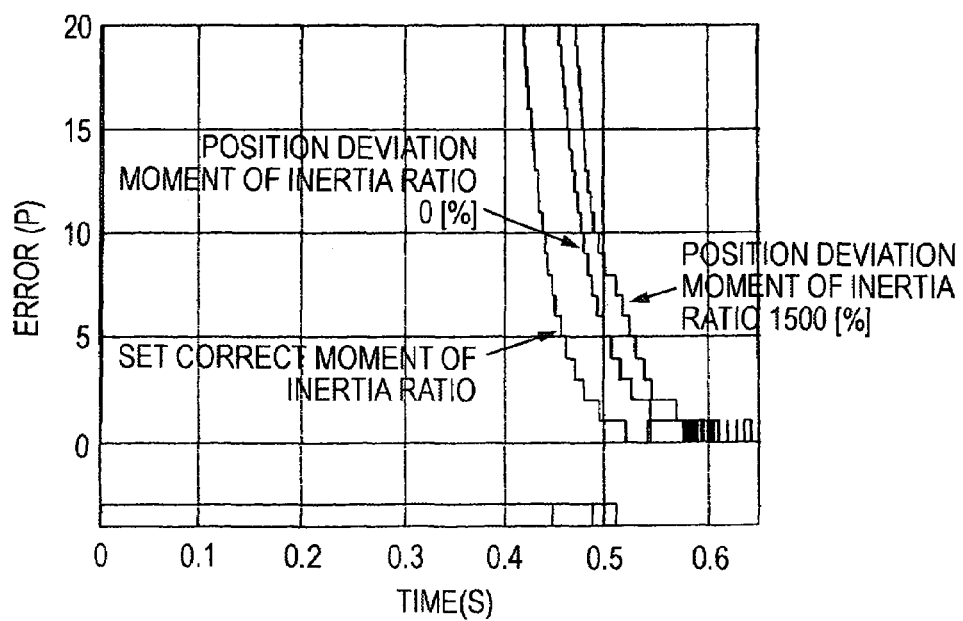
FIG. 7 is a graph showing a positioning time period of the position control system using both of the first degree disturbance observer and the phase advancing filter according to Embodiment 1.

Although according to Embodiment 1, the stability of the control system can be promoted and the stable moment of inertia (inertia mass) ratio is widened, since the filter is incorporated in the position control system, there poses a problem that the response is retarded. FIG. 7 shows positioning responses in a case in which the control of Embodiment 1 is carried out when, for example, the moment of inertia (inertia mass) ratio is 15 times, and a case in which the control of Embodiment 1 is carried out when the moment of inertia (inertia mass) ratio is 0 times. FIG. 7 shows a result of comparing positioning time periods and when time periods by which a position deviation waveform becomes 0 are compared, it is known that the positioning time periods are prolonged in comparison with that when the moment of inertia (inertia mass) ratio is set with a correct value. Further, it is known that the larger the moment of inertia (inertia mass) ratio, the more prolonged is the positioning time period.

In order to resolve the problem, a control block as shown by FIG. 8 may be constituted by using a speed observer described in, for example, JP-A-2002-229605 (Patent Reference 2) by the applicant.

Figure 8A:
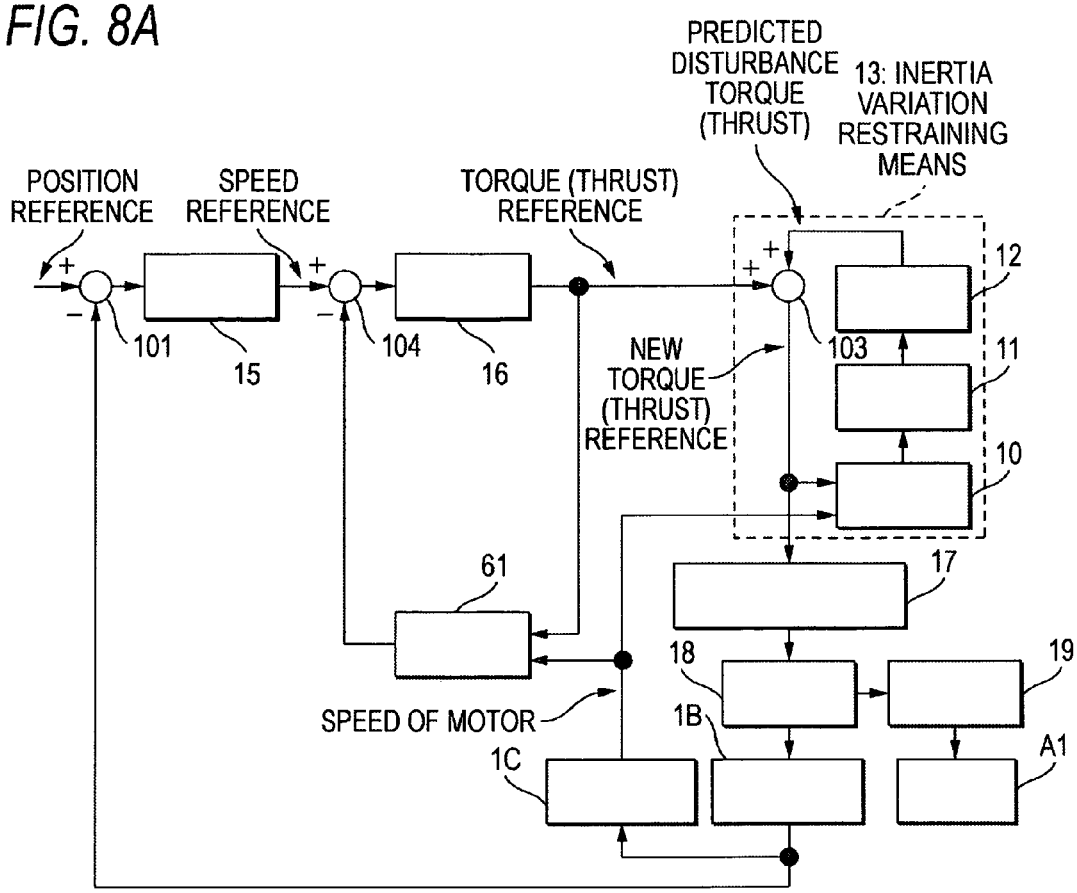
FIG. 8 illustrates control block diagrams of Embodiment 2 of the invention.
Figure 8B:
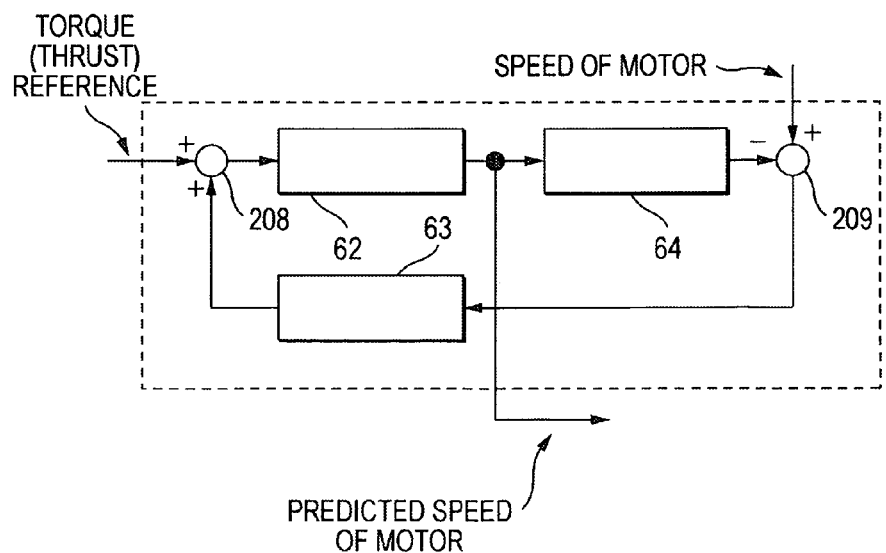

According to Embodiment 2 shown in FIG. 8(a), in place of the phase compensating portion 14 having the constitution of Embodiment 1 shown in FIG. 1, there is provided a phase compensating portion 61 for carrying out phase compensation based on the torque (thrust) reference and the speed of the motor. That is, the output of the speed calculating portion 1C is inputted to the disturbance observer 10 and an output of the phase compensating portion 61 (predicted speed of the motor) is made to constitute a new feed back signal. According to the phase compensating portion 61, as shown by FIG. 8(b), the torque (thrust) reference is inputted to a model 62 of a control object, an output thereof is made to pass a low pass filter 64 to thereby generate a phase compensating signal and a deviation between the output and the speed of the motor is fed back to an adder 208 inputted with the torque (thrust) reference by way of a controller 63. In the drawing, numeral 208 designates an adder, numeral 209 designates a subtractor.

Referring back to FIG. 8(a), a difference between a speed reference and a new speed feed back signal is generated by a subtractor 104 to be inputted to the speed control portion 16, and the output of the speed control portion 16 is inputted to the phase compensating portion 61 and the inertia variation restraining portion 13.

A speed control system can be constituted by inputting the output of the inertia variation restraining portion 13 to the torque (thrust) control portion 17 of the motor. As explained in Patent Reference 2, the speed observer can not only predict the speed but also advance the phase and therefore, by advancing the phase of the speed control system, an allowance of the phase of the position control system can be improved. Therefore, the response can be stabilized and the inertia variation range can be widened.

Figure 9:
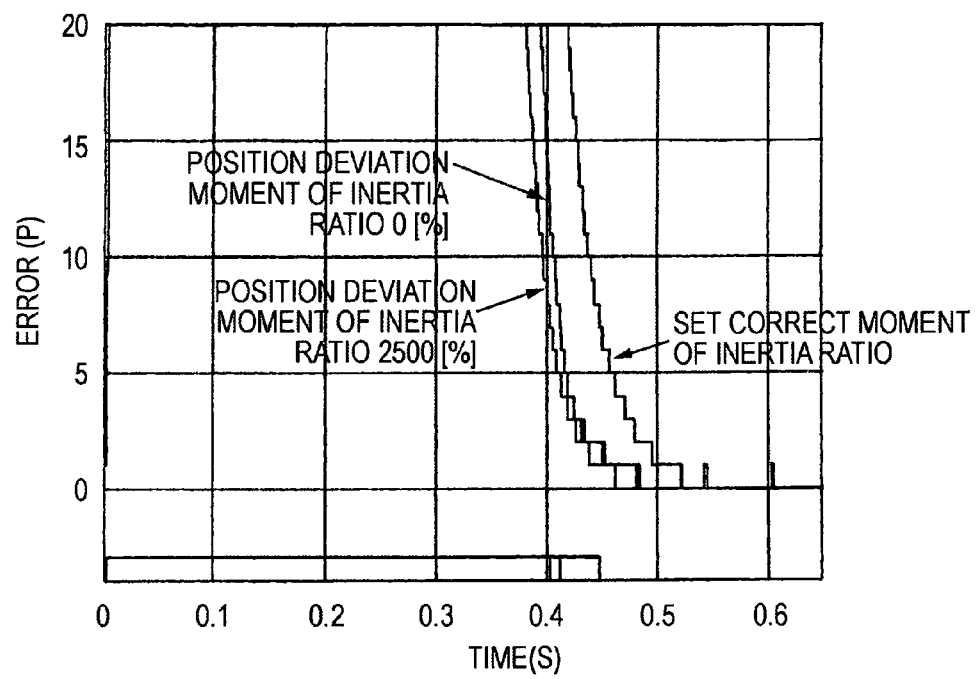
FIG. 9 is a graph showing a positioning time period of a position control system using both of a first degree disturbance observer and a phase compensating speed observer according to Embodiment 2.

FIG. 9 shows a speed of the motor when the speed control portion 16 is set with the correct moment of inertia (inertia mass) ratio and position deviation waveforms of the motor when the moment of inertia (inertia mass) ratio is 0 times, 15 times at the speed control portion of Embodiment 2 (computer simulation result). Since graphs of 0 times and 25 times are overlapped, there can be confirmed an effect in which positioning time periods become substantially the same at 0 times and 25 times of the moment of inertia ratio.

Further, the position time periods become shorter than that when the speed calculating portion is set with the correct moment of inertia (inertia mass) ratio.

That is, according to the embodiment, there is achieved an effect of capable of stabilizing the control system up to the moment of inertia (inertia mass) ratio wider than that of the conventional art, and capable of making the positioning time period shorter than that when the correct moment of inertia ratio (inertia mass) is set.

Embodiment 3

According to the constitution of Embodiment 2, the response becomes always faster than that when the speed control system is set with the correct moment of inertia (inertia mass) ratio, which is preferable for positioning operation or the like.

However, in a track control operation, it is necessary to balance, for example, biaxial operations of X and Y and when the response becomes excessively fast only monoaxially, the track accuracy is not improved. In this case, there is needed a response the same as that when the correct moment of inertia (inertia mass) ratio is set.

Figure 10:
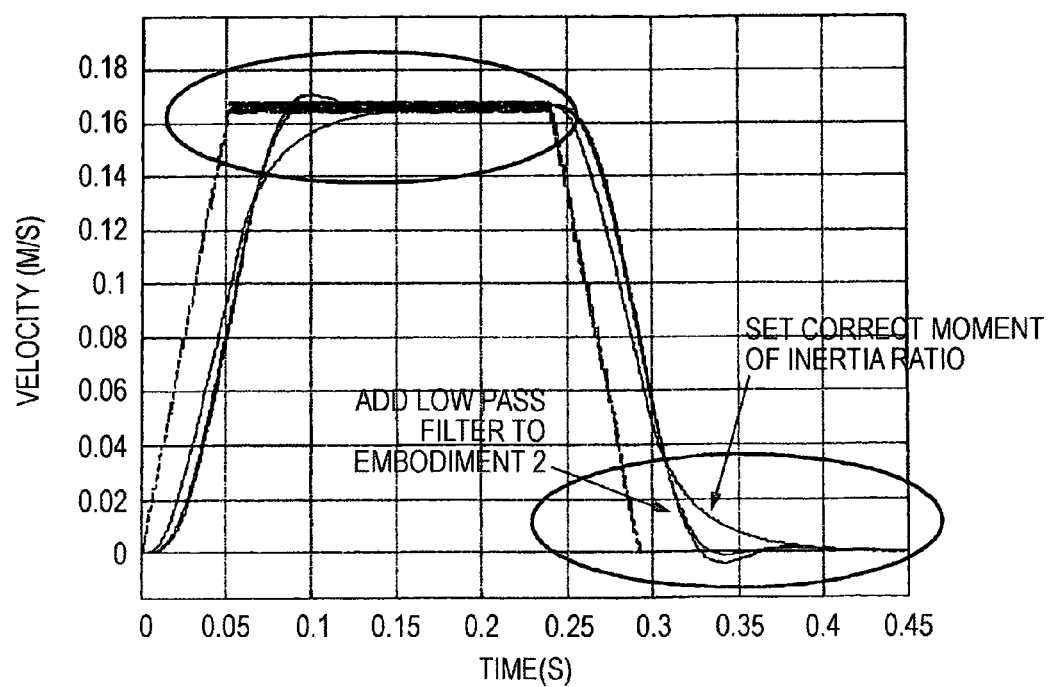
FIG. 10 is a graph showing a response of a position control system using all of a disturbance observer and a phase compensating speed observer and a low pass filter according to Embodiment 2.

Although normally, the response is adjusted to be more or less retarded by the constitution of Embodiment 2 and therefore, it is liable to be conceived that the position reference may use the low pass filter, thereby, as shown by FIG. 10, a waveform of a total of the response is shifted and the same response cannot be realized even when the response and the positioning time period are matched in a case of matching the moment of inertia (inertia mass).

In order to resolve the problem, it is conceived that a compensating method more or less retarding the response while providing the robust property is indispensable to reach a conception of combining the phase compensating portion of Embodiment 1 and the phase compensating portion of Embodiment 2.

Figure 11:
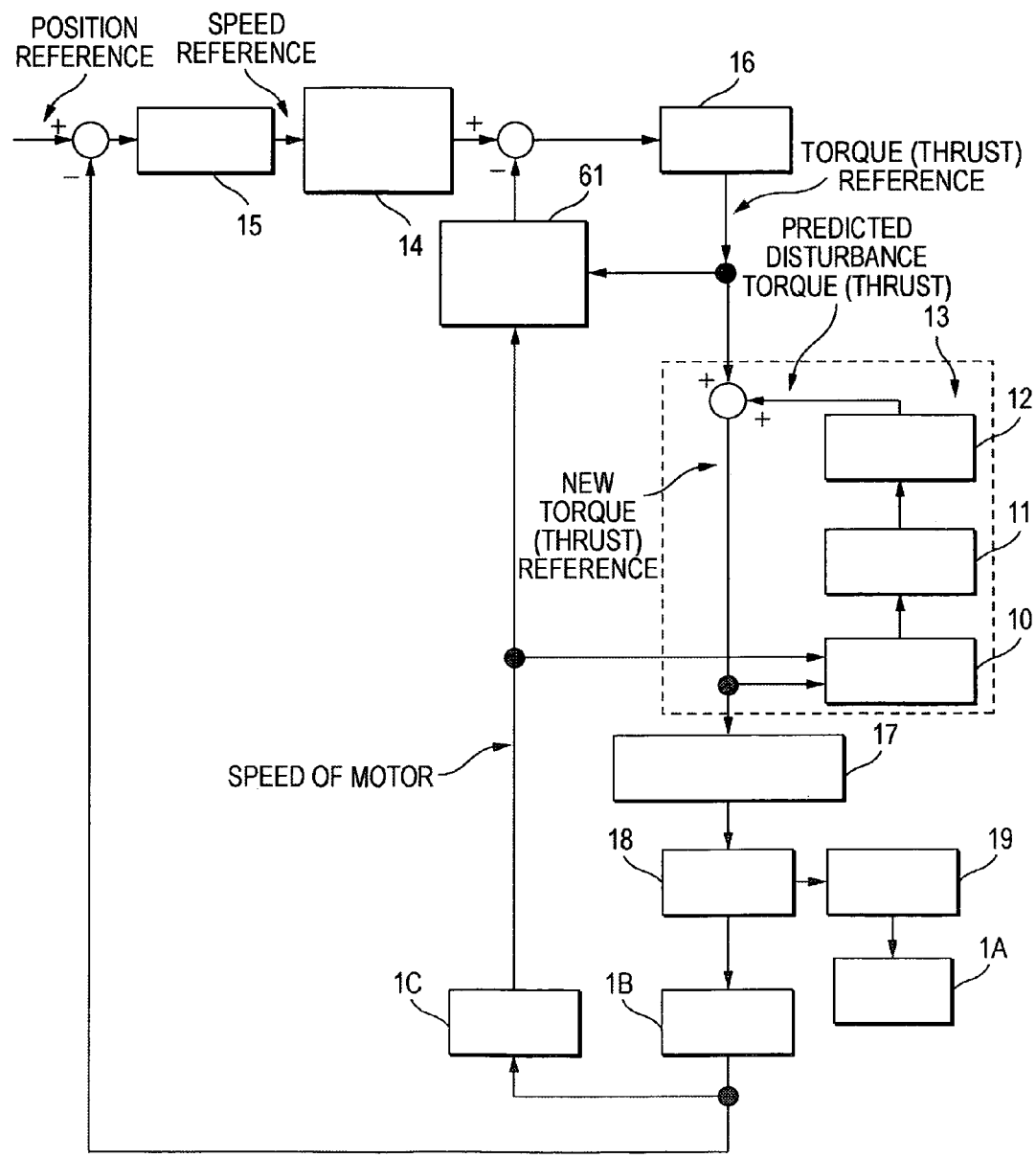
FIG. 11 is a control block diagram of Embodiment 3 of the invention.

Specifically, as shown by FIG. 11, the normal speed control system is combined with the inertia variation restraining portion 13 and the first phase compensating portion 14 (the same as the phase compensating portion 14 of Embodiment 1) and the second phase compensating portion 61 (the same as the phase compensating portion 61 of Embodiment 2).

The speed reference is inputted to the first phase compensating portion 14 and the output of the first phase compensating portion 14 is made to constitute the new speed reference.

The output of the second phase compensating portion 61 is made to constitute a new speed feedback signal, a difference between the new speed reference and the new speed feed back signal is inputted to the speed control portion 16, and the output of the speed control portion 16 is inputted to the inertia variation restraining portion 13 and the second phase compensating portion 61.

A speed control system can be constituted by constituting a new torque (thrust) reference by the output of the inertia variation restraining portion 13 to be inputted to the torque (thrust) control portion 17 of the motor.

Further, the first phase compensating portion may be constituted as shown by FIG. 5 similar to the first embodiment and the second phase compensating portion may be constituted as shown by FIG. 8(b) similar to Embodiment 2.

Figure 12:
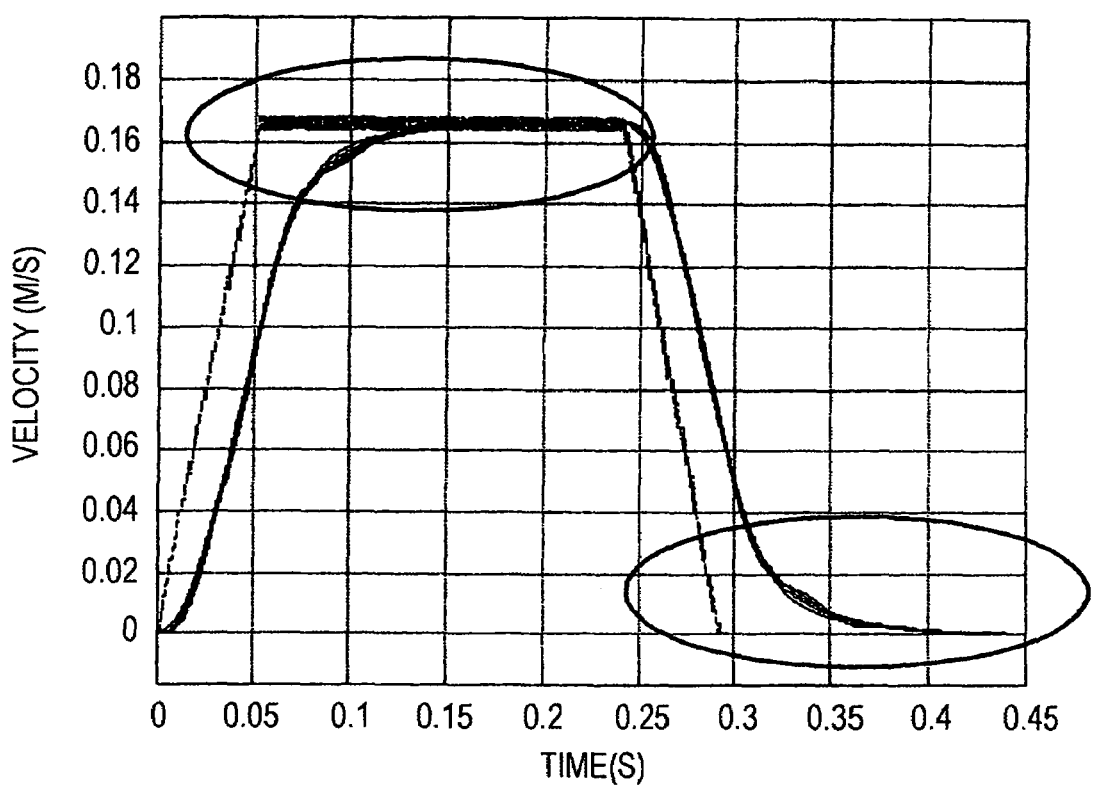
FIG. 12 is a graph showing a response of a position control system using all of a disturbance observer and a phase compensating speed observer and a phase advancing filter according to Embodiment 3.

FIG. 12 shows the speed of the motor when the speed control portion 16 is set with the correct moment of inertia (inertia mass) ratio and the speed of the motor when the moment of inertia (inertia mass) ratio is 0 times, 15 times, 25 times, 30 times according to the constitution of the embodiment (computer simulation result). When a waveform immediately after the speed of the motor is changed from an accelerated speed to an equal speed and a waveform immediately after the motor speed is changed from a decelerated speed to zero speed (portions surrounded by ellipses in the drawing) are compared, all of the graphs are overlapped to constitute substantially the same response. That is, by combining the two first and second phase compensating portions, the response becomes substantially the same as that when the correct moment of inertia (inertia mass) ratio is set, further, the robust range regardless of the inertia variation is widened up to 30 times.

According to the embodiment, there is achieved an effect of capable of stabilizing the control system up to 30 times of the moment of inertia (inertia mass) ratio wider than 10 times thereof in the conventional art and capable of making the positioning response equivalent to that when the correct moment of inertia (inertia mass) ratio is set.

Embodiment 4

As explained by Embodiment 2, the variation in the inertia can be restrained only by the inertia variation restraining portion 13 and the phase compensating portion

61 as shown by FIG. 8(*a*) without setting the moment of inertia (inertia mass) ratio in the control system. At this occasion, when a speed loop gain (not illustrated) in the speed control portion 16 is increased, the phase to be compensated for by the phase compensating portion 61 is shifted and therefore, a vibration is generated. Therefore, it is necessary to readjust the phase compensating by the phase compensating portion 61 in accordance with the speed loop gain (not illustrated) in the speed control portion 16.

Figure 13:
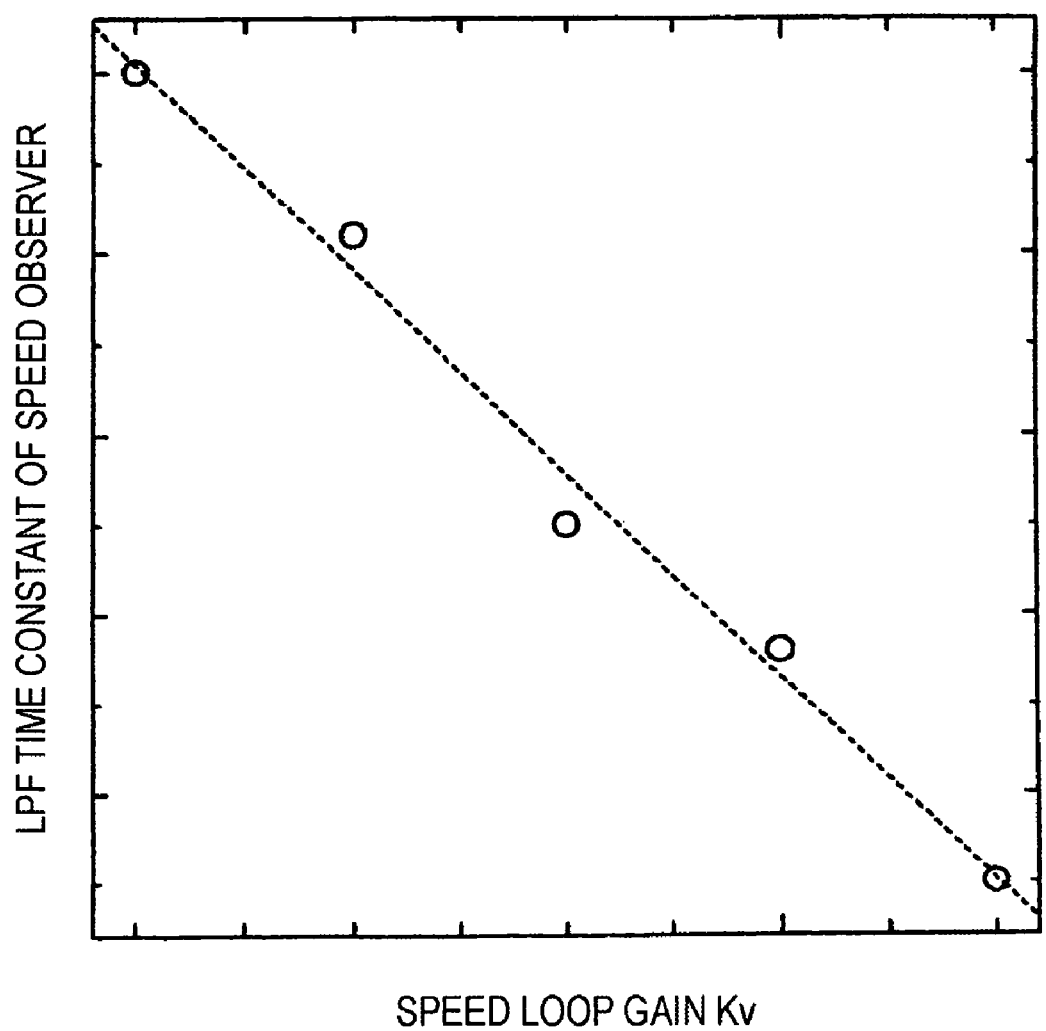
FIG. 13 is a graph showing a relationship between a speed loop gain and a time constant of a low pass filter of a phase compensating speed observer when both of a first degree disturbance observer and the phase compensating speed observer according to Embodiment 3 are used.
Figure 14:
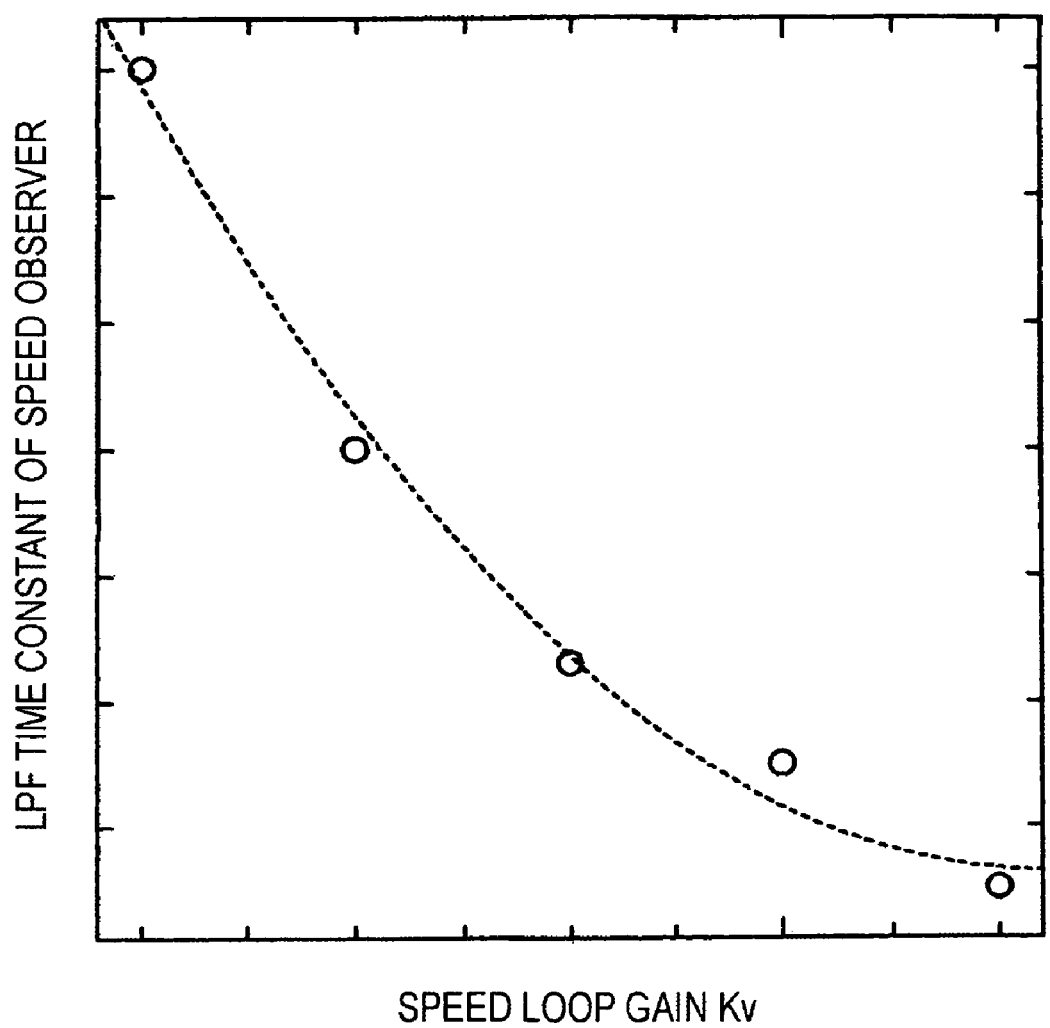
FIG. 14 is a graph showing a relationship between a speed loop gain and a time constant of a low pass filter of a phase compensating speed observer when both of a second degree disturbance observer and the phase compensating speed observer according to Embodiment 3 are used.
Figure 15A:
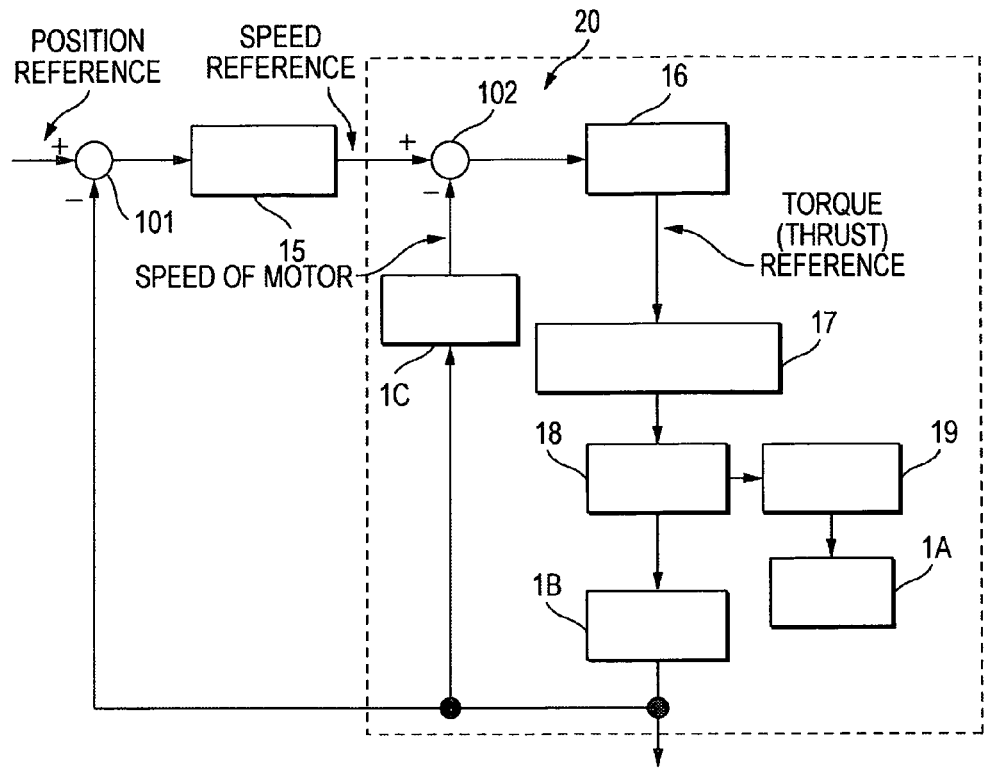
FIG. 15 illustrates block diagrams of a position control system of a general motor.
Figure 15B:
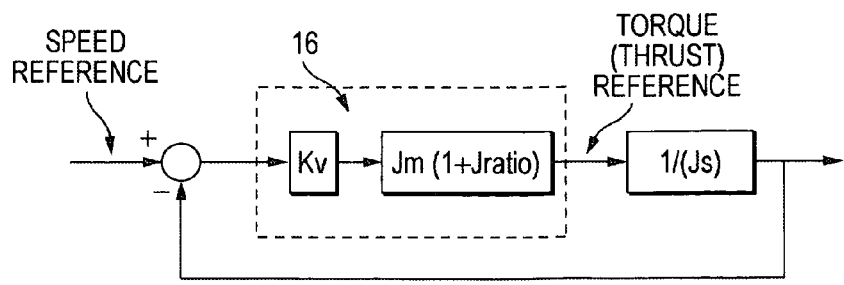
Figure 16:
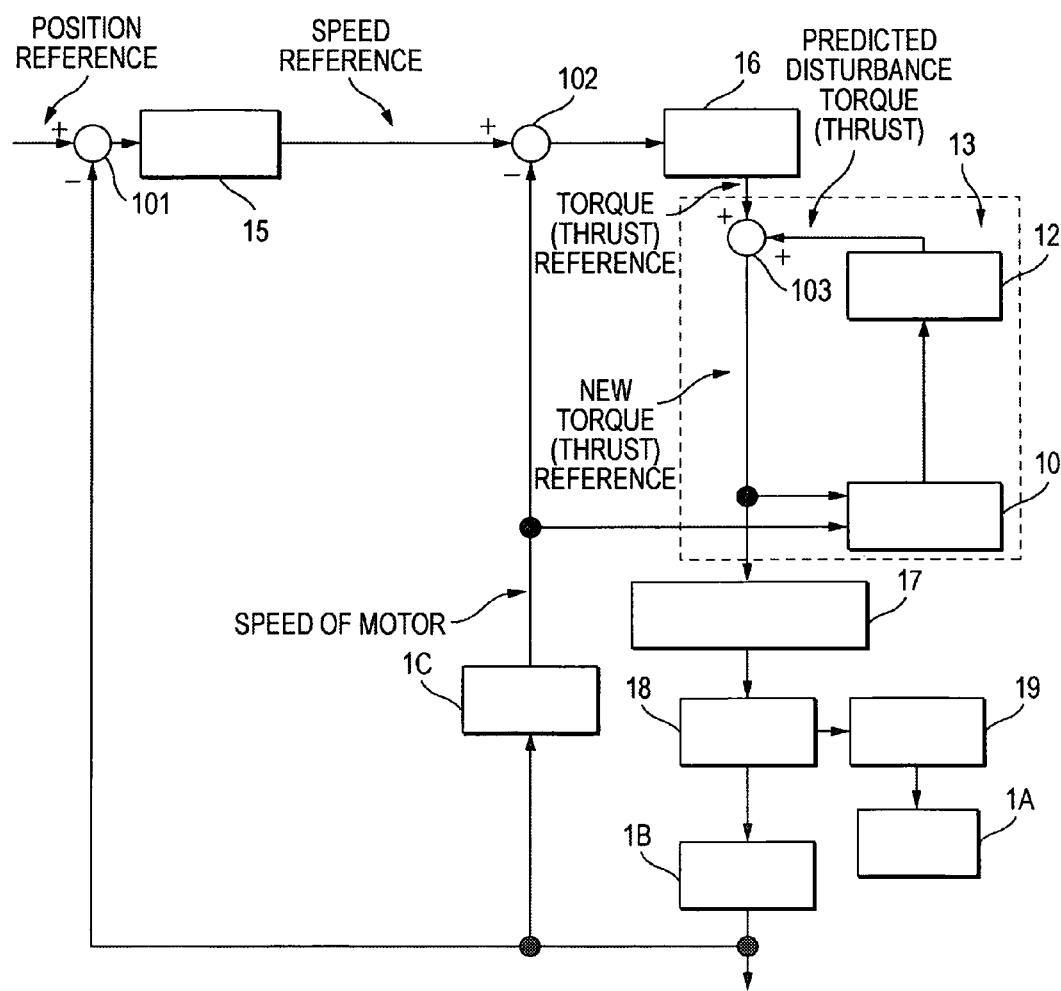
FIG. 16 is a control block diagram of a first conventional art.
Figure 17:
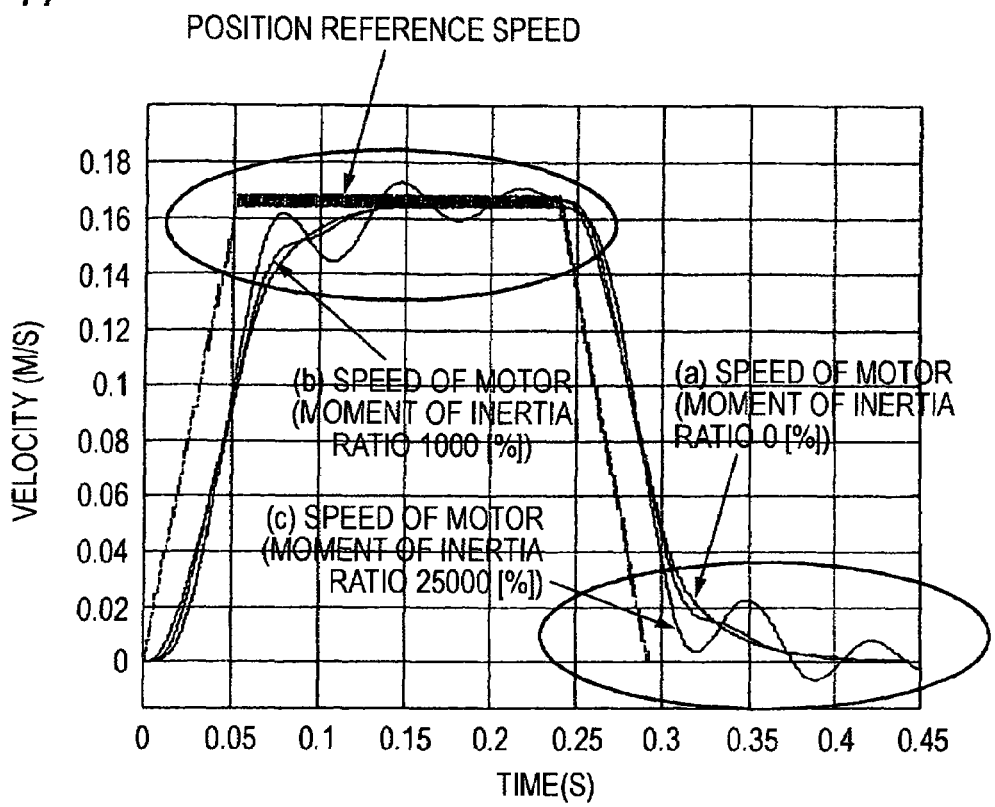
FIG. 17 is a graph showing a response of a position control system applied with a first degree disturbance observer according to the first conventional art.

For example, when the phase of the speed observer described in Patent Reference 2 is compensated for, as shown by FIG. 8(*b*), an amount of the phase to be compensated for is set by a time constant of the low pass filter 64 of the speed observer. When the time constant of the low pass filter 64 is determined by a simulation or an actual test, a graph as shown by FIG. 13 or FIG. 14 can be drawn. In the drawings, ○ mark designates measured data and a broken line draws an approximation equation for interpolating the actual data.

Further, based on the graph, for example, according to a first degree disturbance observer, an approximation equation can be determined by a first degree function as shown by Equation (4) from FIG. 13. A time constant LPF of the low pass filter of the speed observer may be set in accordance with a set value of the speed loop gain (not illustrated) in the speed control portion 16.

$$LPF = a \times K_v + b \quad (4)$$

Further according to a second degree disturbance observer, as shown by FIG. 14, the approximation can be carried out by a secondary degree function of Equation (5).

$$LPF = a \times K_v^2 + b \times K_v + c \quad (5)$$

Therefore, by using the approximation equations, for example, when the speed loop gain (not illustrated) in the speed control portion 16 is changed, the time constant of the low pass filter 64 of the speed observer can be changed by the functions and the value of compensating for the phase can automatically be readjusted.

Embodiment 5

For example, even when the second phase compensating portion 61 is made to constitute the speed observer as shown by Patent Reference 2 in Embodiment 3, similar to Embodiment 4, the time constant of the low pass filter 64 of the speed observer constituting the second phase compensating portion 61 shown in FIG. 8(*b*) needs to be changed in accordance with the speed loop gain (not illustrated) in the speed control portion 16.

When the time constant of the low pass filter 64 of the speed observer is determined by a simulation or an actual test, the graph as shown by FIG. 13 or FIG. 14 can be drawn. In the drawing, ○ mark designates the actual data and the broken line draws the approximation equation for interpolating the measured data.

According to the interpolation approximation equation, similar to Embodiment 4, the time constant LPF of the low pass filter of the speed observer may be determined from the speed loop gain (not illustrated) $K_v$ in the speed control portion 16 by the first degree function of FIG. 13 in the case of the first degree disturbance observer.

Further, in the case of the second degree disturbance observer, the time constant LPF of the low pass filter of the speed observer may be determined from the speed loop gain (not illustrated) $K_v$ in the speed control portion 16 by the second degree function of FIG. 14.

Therefore, by using the approximation equations, for example, when the speed loop gain (not illustrated) in the speed control portion 16 is changed, the time constant of the low pass filter 64 of the speed observer can be changed by the functions and the value of compensating for the phase can automatically be readjusted.

Further, also according to the first phase compensating portion 14, similar to the second phase compensating portion, time constants of the low pass filter 51 and the high pass filter 52 can be determined by the function of the speed loop gain (not illustrated) $K_v$ in the speed control portion 16 by a simulation or an actual test. Therefore, by using the approximation equations, for example, when the speed loop gain (not illustrated) in the speed control portion 16 is changed, the value of compensating for the phase can automatically be readjusted.

Embodiment 6

The variation in the inertia can be restrained only by the inertia variation restraining portion 13 and the phase compensating portion 14 as shown by FIG. 1 without setting the moment of inertia (inertia mass) ratio in the control system as explained in Embodiment 1. At this occasion, when the speed loop gain (not illustrated) in the speed control portion 16 is increased, the phase to be compensated for by the phase compensating portion 14 is shifted and therefore, a vibration is generated. Therefore, it is necessary to readjust the phase compensated for by the phase compensating portion 14 in accordance with the speed loop gain (not illustrated) in the speed control portion 16.

Figure 18:
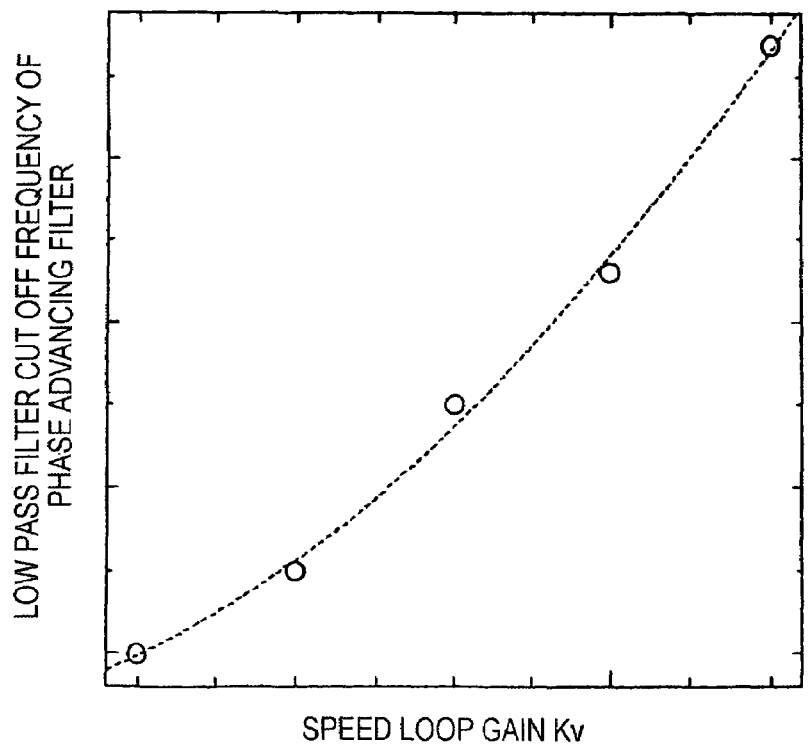
FIG. 18 is a graph showing a relationship between a speed loop gain and a cut off frequency of a low pass filter of a phase advancing filter when both of the first degree disturbance observer and the phase advancing filter according to Embodiment 1 are used.
Figure 19:
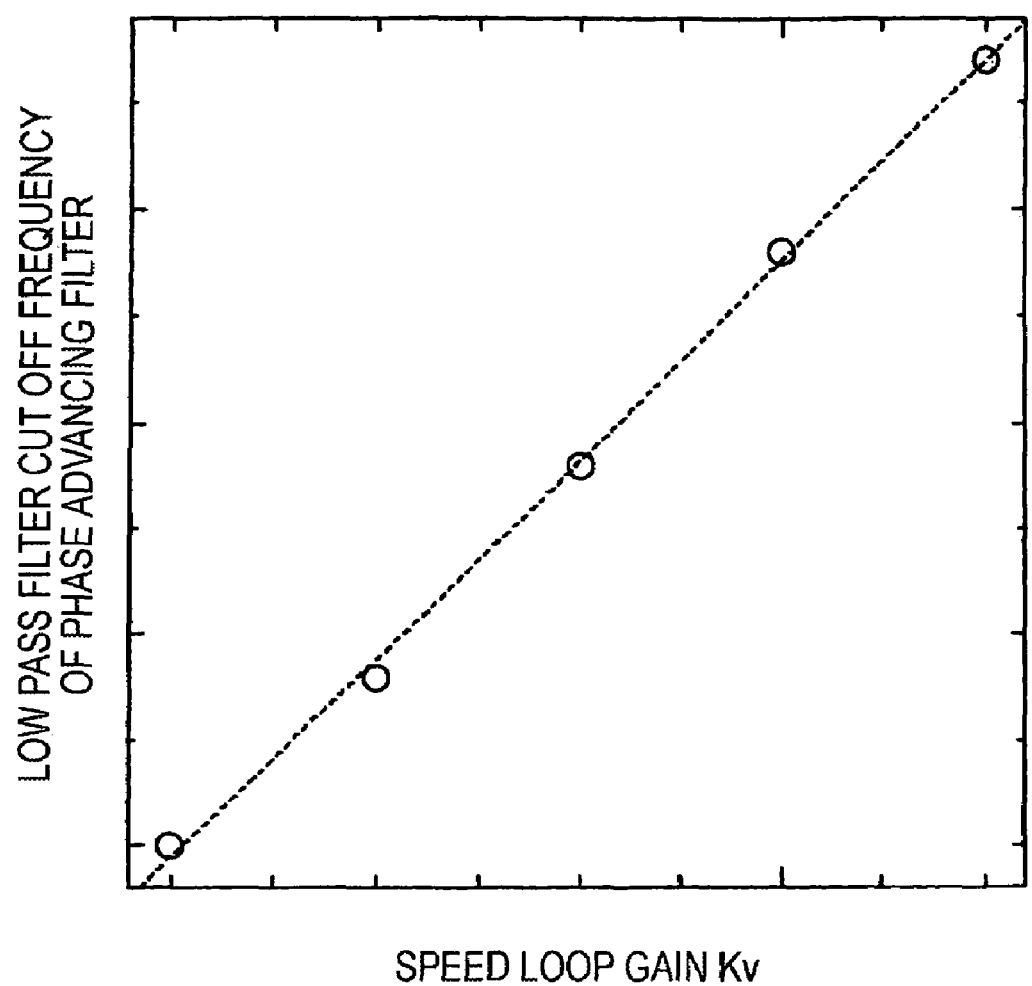
FIG. 19 is a graph showing a relationship between a speed loop gain and a cut off frequency of a low pass filter of a phase advancing filter when both of a second degree disturbance observer and the phase advancing filter according to Embodiment 1 are used.
Figure 20:
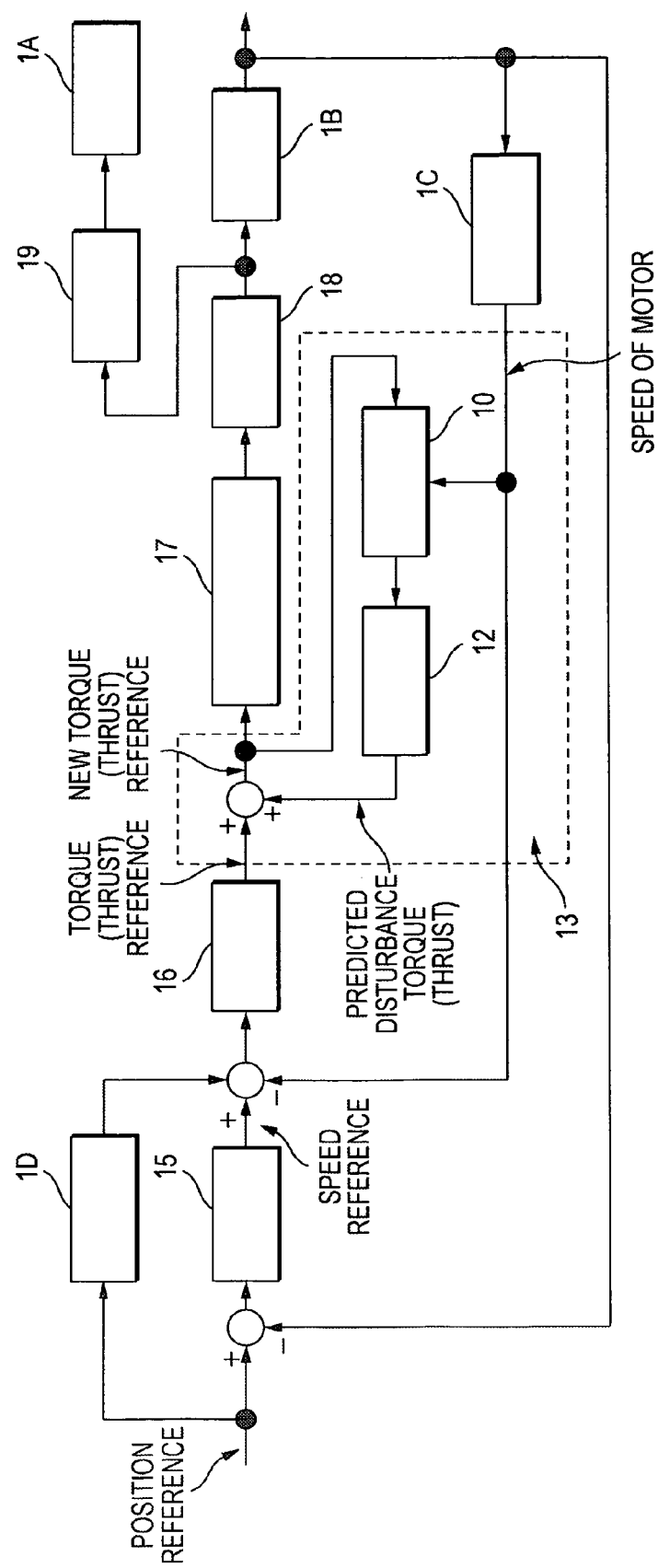
FIG. 20 is a control block diagram of a second conventional art.

For example, when the phase advancing filter is made to constitute the phase compensating portion 14, as shown by FIG. 5, an amount of the phase to be compensated for is set by the cut off frequencies of the low pass filter 51 and the high pass filter 52. When the cut off frequency of the low pass filter 51 is determined by a simulation or an actual test, graphs as shown by FIG. 18 and FIG. 19 can be drawn. In the drawings, ○ mark designates measured data, and a broken line draws an approximation equation for interpolating the measured data.

Further, when based on the graph, for example, according to a first degree disturbance observer, from FIG. 18, an approximation equation can be determined by a second degree function as shown by Equation (6). A cut off frequency fc of the low pass filter of the phase advancing filter may be set in accordance with the set value of the speed loop gain (not illustrated) in the speed control portion 16.

$$fc = a \times K_v^2 + b \times K_v + c \quad (6)$$

Further, according to a second degree disturbance observer, as shown by FIG. 19, the cut off frequency fc can be approximated by a first degree function of Equation (7) as shown by FIG. 19.

$$fc = a \times K_v + b \quad (7)$$

Therefore, by using the approximation equations, for example, when the speed loop gain (not illustrated) in the speed control portion 16 is changed, the cut off frequency of the low pass filter 51 of the phase advancing filter can be changed by the function and the value of compensating for the phase can automatically be readjusted.

Embodiment 7

For example, even when the first phase compensating portion 14 is made to constitute the phase advancing filter in Embodiment 3, similar to Embodiment 6, the cut off frequency of the low pass filter 51 of the phase advancing filter constituting the first phase compensating portion 14 shown in FIG. 5 needs to be changed in accordance with the speed loop gain (not illustrated) in the speed control portion 16.

When the cut off frequency of the low pass filter 51 of the phase advancing filter is determined by a simulation or an actual test, the graphs as shown by FIG. 18 and FIG. 19 can be drawn. In the drawings, ○ mark designates measured data and a broken line draws the approximation equation for interpolating the measured data.

According to the interpolation approximation equation, similar to Embodiment 6, for example, in the case of the first degree disturbance observer, the cut off frequency fc of the low pass filter of the phase advancing filter may be determined from the speed loop gain (not illustrated) $K_v$ in the speed control portion 16 by the second degree function of FIG. 18.

Further, in the case of the second degree disturbance observer, the cut off frequency fc of the low pass filter of the phase advancing filter may be determined from the speed loop gain (not illustrated) $K_v$ in the speed control portion 16 by the first degree function of FIG. 19.

Therefore, by using the approximation equations, for example, when the speed loop gain (not illustrated) in the speed control portion 16 is changed, the cut off frequency of the low pass filter 51 of the phase advancing filter can be changed by the functions and the value of compensating for the phase can automatically be readjusted.

Embodiment 8

An explanation has been given on the premise that the motor control apparatus is operated mainly as the position control apparatus. In Embodiment 8, an explanation will be given of the fact that even when the motor control apparatus is operated as a speed control apparatus, an effect similar to that when the motor control apparatus is operated as the position control apparatus is achieved. Further, the invention having an eighth constitution through the invention having an eleventh constitution are for a case in which the motor control apparatus is operated as the speed control apparatus.

In a constitution of FIG. 8(*a*) explained in Embodiment 2, it is well known that the motor control apparatus is operated as the speed control apparatus except the position control system inputting the difference between the output of the position detecting portion 1B and the position reference to the position control portion 15 and constituting the speed reference by the output of the position control portion 15.

At this occasion, there is constructed a constitution in which there is provided the phase compensating portion 61 for carrying out phase compensation based on the torque (thrust) reference and the speed of the motor, the output of the speed calculating portion 1C is inputted to the phase compensating portion 61 and the disturbance observer 10 in the inertia variation restraining portion 13, and the output of the phase compensating portion 61 (predicted speed of the motor) is made to constitute the new speed feed back signal and therefore, the constitution remains unchanged in a case in which the motor control apparatus is operated as the position control apparatus and a case in which the motor control apparatus is operated as the speed control apparatus.

Therefore, even when the motor control apparatus is operated as the speed control apparatus, the control function can be ensured even for the large moment of inertia ratio (inertia mass ratio).

Further, when the motor control apparatus is operated as the speed control apparatus, operation and effect of respective portions having the same notations are the same as operation and an effect of respective portions having the same notations in the explanation when the motor control apparatus is operated as the position control apparatus and therefore, an explanation thereof will be omitted.

Embodiment 9

Figure 24:
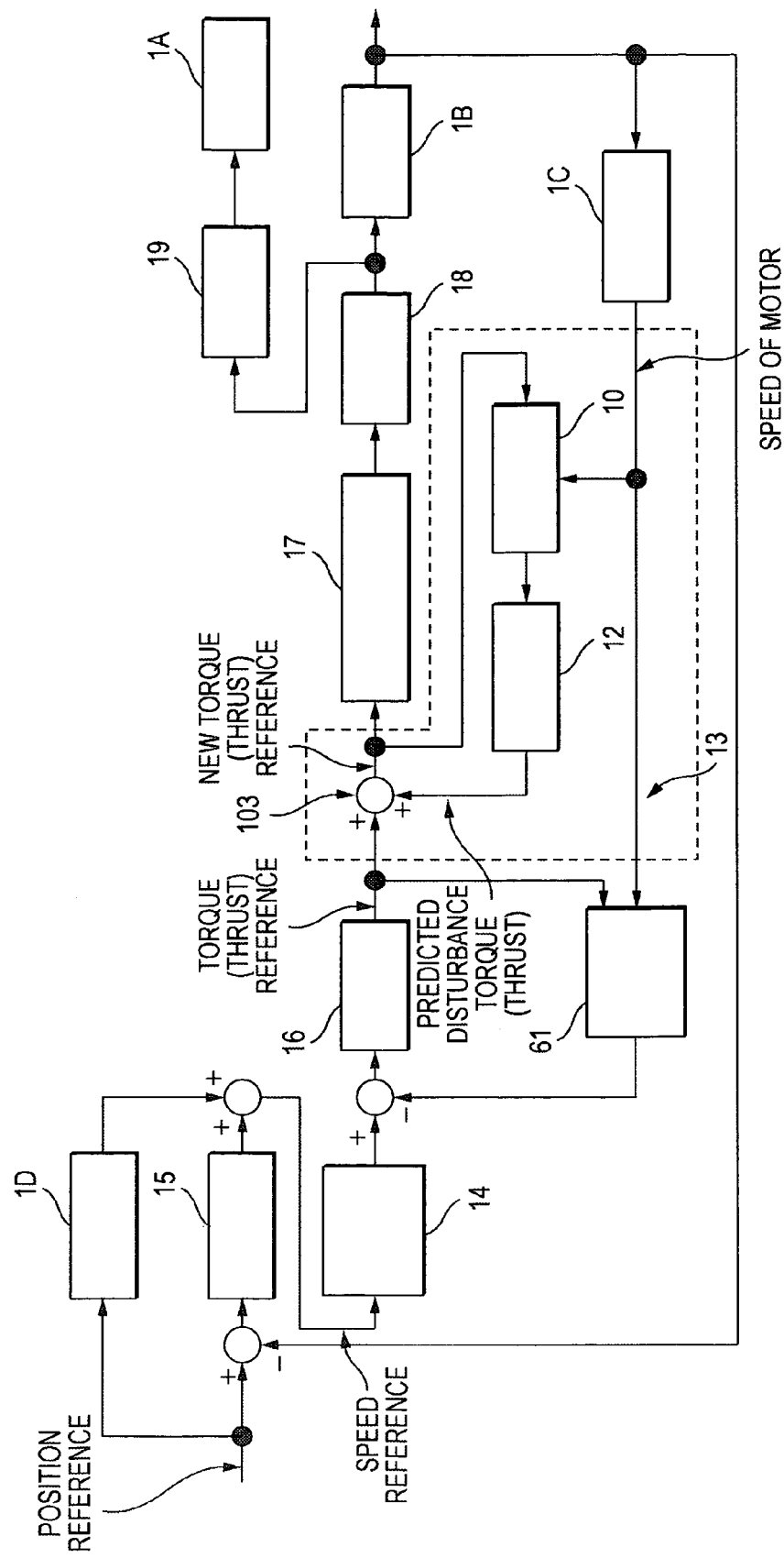
FIG. 24 is a control block diagram of Embodiment 9 of the invention.

According to the embodiment, an explanation will be given of an embodiment of the invention resolving the problem of the position control system having speed FF as has been explained in the second conventional art. FIG. 24 is a control block diagram of Embodiment 9 of the invention showing a constitution of adding speed feed forward to the constitution of the third embodiment shown in FIG. 11.

Similar to FIG. 11, the normal speed control system is combined with the inertia variation restraining portion 13 and the first phase compensating portion 14 (the same as the phase compensating portion 1 of Embodiment 1) and the second phase compensating port 61 (the same as the phase compensating portion 61 of Embodiment 2). In the drawing, the speed reference is inputted to the first phase compensating portion 14, and the output of the first phase compensating portion 14 is made to constitute the new speed reference. The output of the second phase compensating portion 61 is made to constitute the new speed feed back signal, the difference between the new speed reference and the new speed feed back signal is inputted to the speed control portion 16, and the output of the speed control portion 16 is inputted to the inertia variation compensating portion 13 and the second phase compensating portion 61. The speed control system can be constituted by inputting the output of the inertia variation restraining portion 13 to the torque (thrust) control portion 17 as the new torque (thrust) reference. Further, the first phase compensating portion may be constituted as shown by FIG. 5 and the second phase compensating portion may be constituted as shown by FIG. 8(*b*).

Next, in order to apply speed FF from the position reference, the position reference is inputted to the speed FF portion 1D, and the output of the speed FF portion 1D and the output of the position control portion 15 are added to be inputted to the first phase compensating portion 14 as the speed reference. The speed FF portion for generating the speed FF signal is constituted by using a differentiator or an approximate differentiator (constituted by a combination of a low pass filter and a differentiator or a high pass filter) (not illustrated).

Figure 25:
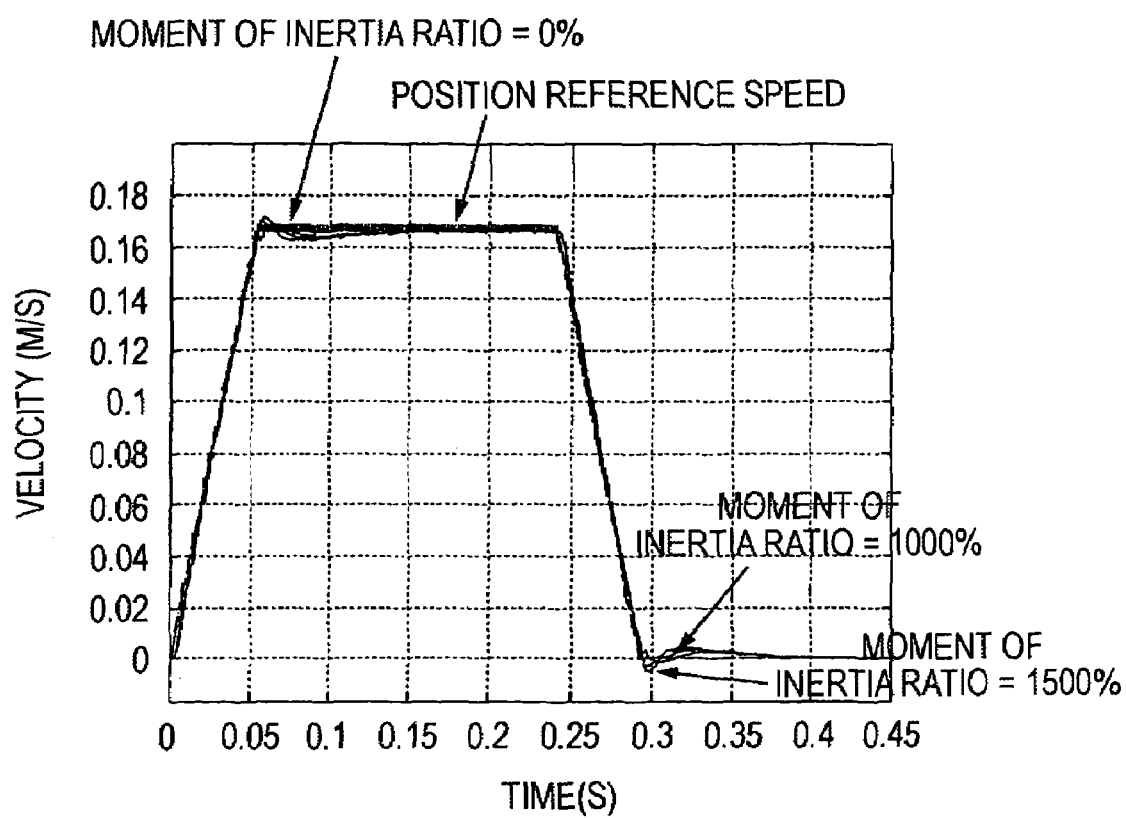
FIG. 25 is a graph showing a response of a position control system applied with speed FF according to Embodiment 9.

FIG. 25 shows a response (computer simulation result) in positioning operation when a speed FF gain (not illustrated) in the speed FF portion is constituted by 90% in the ninth embodiment of the invention. In the drawing, there are shown a speed waveform of the motor when the speed control portion 16 is set with 0 times constituting the correct moment of inertia (inertia mass) ratio in a case of the motor per se (the moment of inertia ratio of which is 0 times) without a load, and a speed waveform of the motor when the actual moment of inertia (inertia mass) ratio is increased (10 times, 15 times) by increasing the inertia of the load by attaching or varying the load while the speed control portion 16 stays to be set as it is. Further, the position reference speed in the drawing signifies a speed component constituted by differentiating the position reference.

Figure 21:
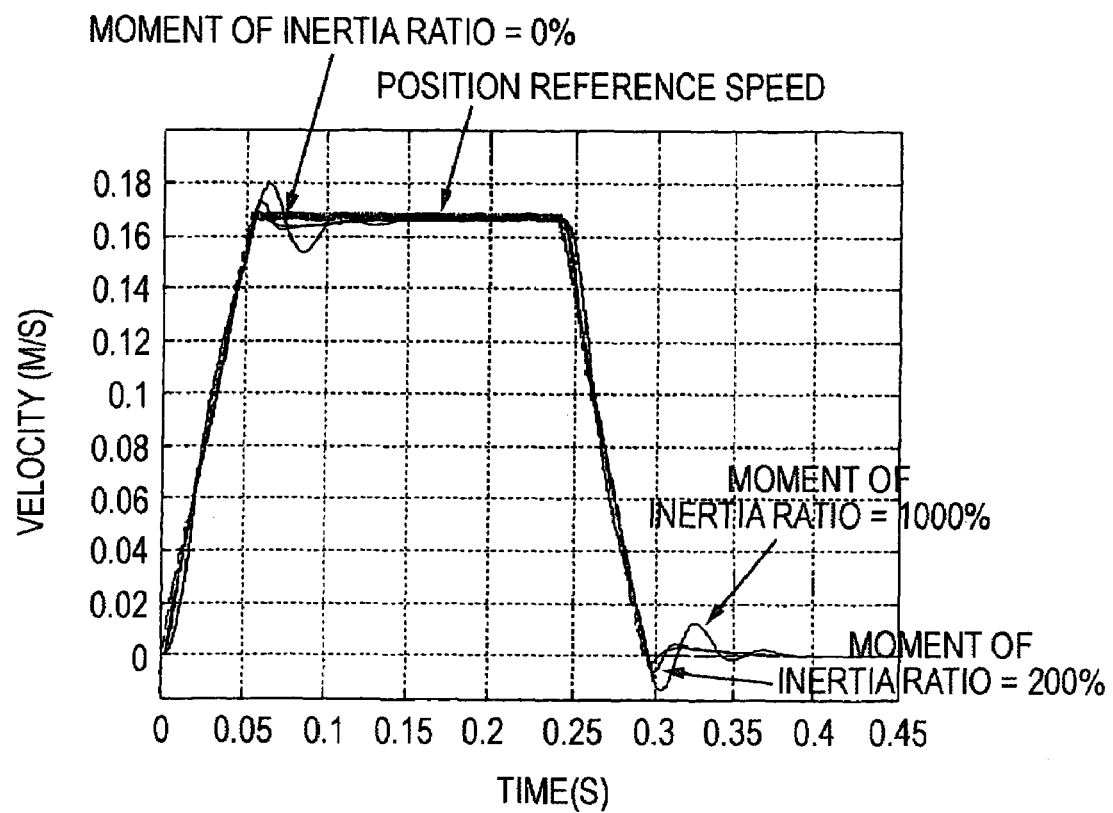
FIG. 21 is a graph showing a response of a position control system applied with speed FF according to a second conventional art.
Figure 22:
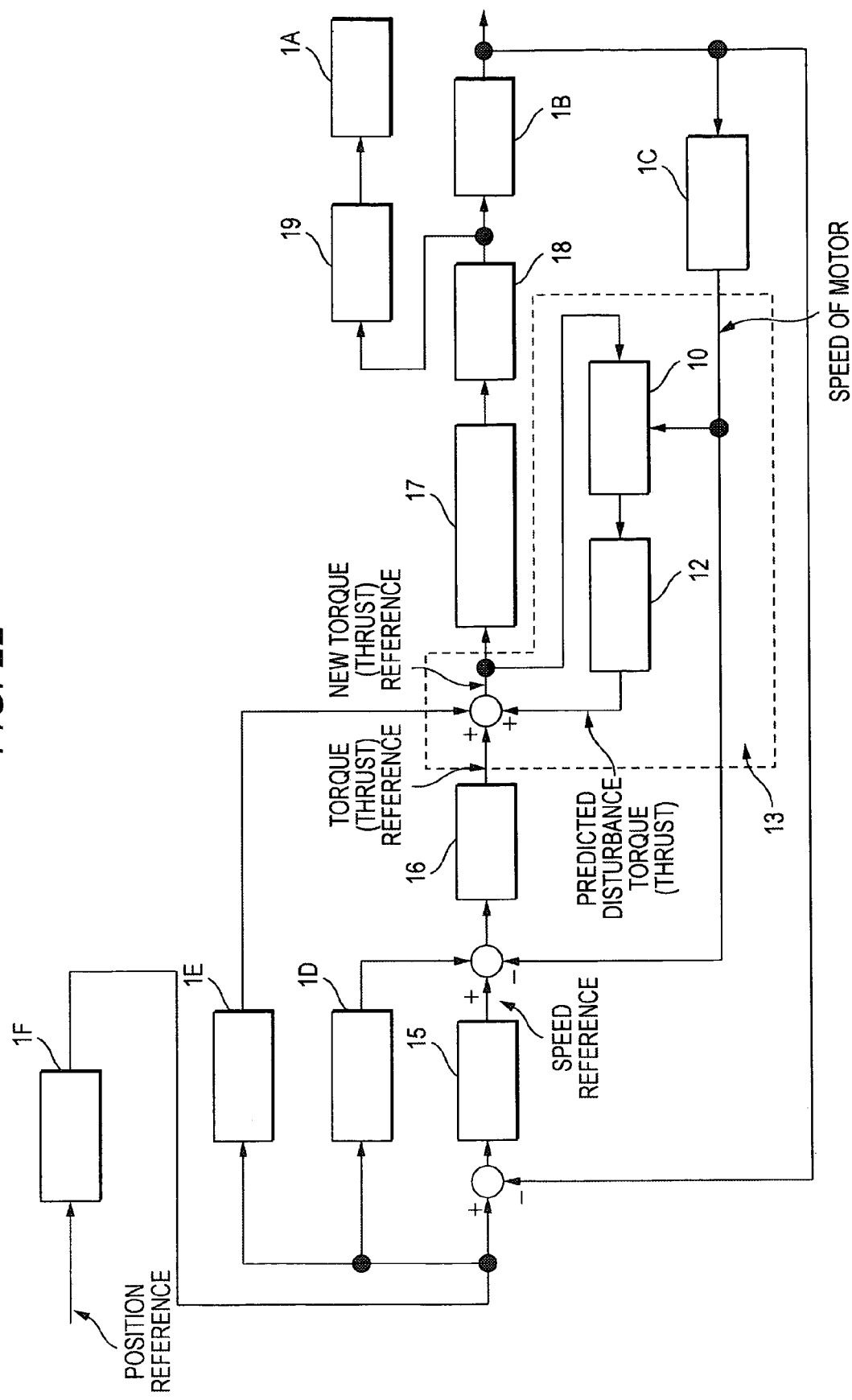
FIG. 22 is a control block diagram of a third conventional art.

When compared with the second conventional art of FIG. 21, the response is stabilized even when the moment of inertia ratio becomes 10 times. Further, when the moment of inertia ratio becomes 15 times, although a vibration is brought about in a waveform immediately after the motor speed is changed from an accelerated speed to an equal speed or immediately after the motor speed is changed from a decelerated speed to the zero speed, the vibration is smaller than that of the second conventional art.

That is, whereas according to the second conventional art, as shown by FIG. 21, when speed FF is applied, the robust range regardless of the variation in the moment of inertia is deteriorated from 10 times to about 2 times, according to the ninth embodiment of the invention, the robust range can be ensured up to 10 times. Further, as is apparent by comparing the speed response of the third embodiment of FIG. 12, the response is accelerated by speed FF. Therefore, by the ninth embodiment of the invention, the problem for making ensuring the robust range and high speed formation of the response compatible which cannot be achieved by the conventional arts can be resolved.

Embodiment 10

Figure 26:
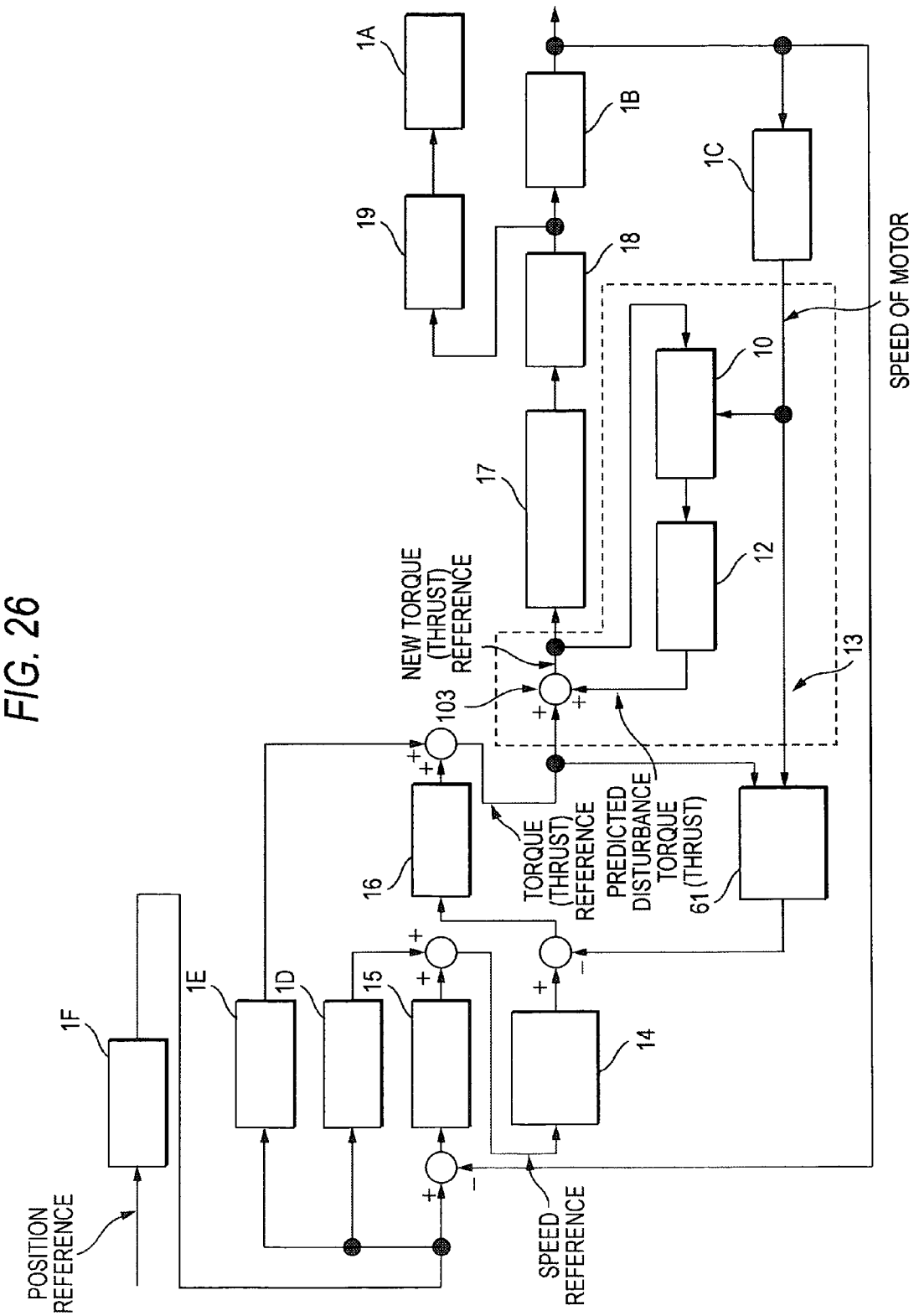
FIG. 26 is a control block diagram of Embodiment 10 of the invention.

According to the embodiment, an explanation will be given of an embodiment of the invention capable of resolving the problem of the position control system having speed FF and torque FF as has been explained in the third conventional art. FIG. 26 is control block diagram of Embodiment 10 of the invention, showing a constitution or adding speed FF and torque FF to the constitution of the third embodiment shown in FIG. 11.

Similar to FIG. 11, the normal speed control system is combined with the inertia variation restraining portion 13 and the first phase compensating portion 14 (the same as the phase compensating portion 1 of Embodiment 1) and the second phase compensating portion 61 (the same as the phase compensating portion 61 of Embodiment 2). In the drawing, the speed reference is inputted to the first phase compensating portion 14, and the output of the first phase compensating portion 14 is made to constitute the new speed reference. The output of the second phase compensating portion 61 is made to constitute the new speed feed back signal, the difference between the new speed signal and the new speed feed back signal is inputted to the speed control portion 16, and the output of the speed control portion 16 is inputted to the inertia variation restraining portion 13 and the second phase compensating portion 61. The speed control system can be constituted by inputting the output of the inertia variation restraining portion 13 to the torque (thrust) control portion 17 of the motor as the new torque (thrust) reference. Further, the first phase compensating portion may be constituted as shown by FIG. 5, and the second phase compensating portion may be constituted as shown by FIG. 8(*b*).

Next, in order to apply speed FF from the position reference, the position reference is inputted to the reference filter portion 1F, the output of the reference filter portion 1F is inputted to the speed FF portion 1D, and the output of the speed FF portion 1D is added with the output of the position control portion 15 to be inputted to the first phase compensating portion 14 as the speed reference. Next, in order to apply torque FF, the output of the reference filter portion 1F is inputted to the torque FF portion 1E, and the output of the torque FF portion 1E is added with the output of the speed control portion 16 to be inputted to the adder 103 and the second phase compensating portion 61 as the torque (thrust) reference. According to the embodiment, with an object of making feed forward signals constituting the outputs of the speed FF portion 1D and the torque FF portion 1E smooth, the position reference is inputted to the reference filter portion 1F. The reference filter portion may be constituted by, for example, exponential acceleration or deceleration constituting a first degree low pass filter, a second degree filter (for example, low pass filter) or a moving average filter or the like. Further, when the position reference is smooth, the reference filter portion can be omitted, and the position reference is directly inputted to the speed FF portion 1D or the torque FF portion 1F.

The speed FF portion 1D for generating the speed FF signal is normally constituted by using a differentiator or an approximate differentiator (constituted by a combination of a low pass filter and a differentiator or a high pass filter) (not illustrated). The torque FF portion 1E for generating the torque (thrust) FF signal is normally constituted by using two stages of differentiators or two stages of approximate differentiators (constituted by a combination of low pass filters and differentiators or high pass filters) in series (not illustrated). Or, although not illustrated, the output of the speed FF portion 1D may be inputted to the torque FF portion 1E. In this case, the torque FF portion 1E is constituted by a single stage of a differentiator or an approximate differentiator.

Figure 27:
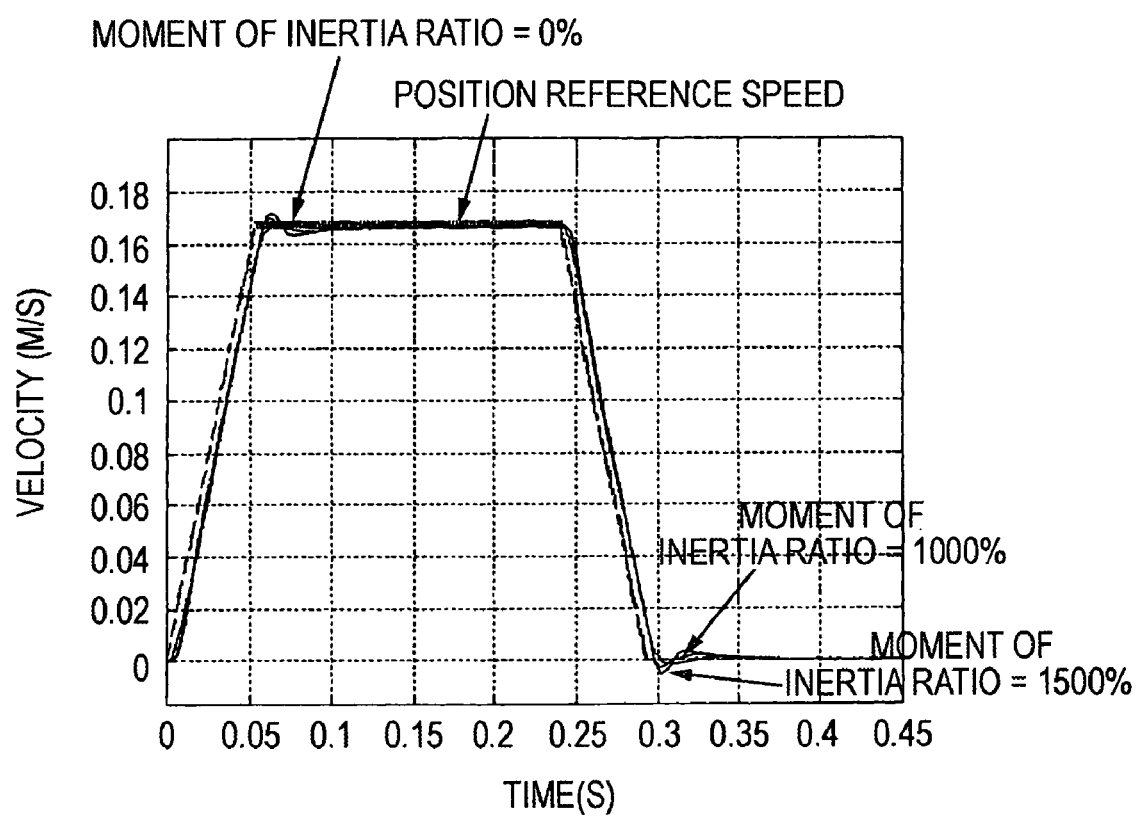
FIG. 27 is a graph showing a response of a position control system applied with speed FF and torque FF according to Embodiment 10.

FIG. 27 shows a response (computer simulation result) in positioning operation when the speed FF gain (not illustrated) in the speed FF portion is set to 10% and the torque FF gain is set to 70% according to the tenth embodiment of the invention. In the drawing, there are shown a speed waveform of the motor when the speed control portion 16 is set with the 0 times constituting the correct moment of inertia (inertia mass) ratio in a case of the motor per se (the moment of inertia ratio of which is 0 times) without a load, and a speed waveform of the motor when the actual moment of inertia (inertia mass) ratio is increased (10 times, 15 times) by increasing the inertia of the load by attaching or varying the load while the speed control portion 16 stays to be set as it is. Here, although since the reference filter portion 1F is constituted by a low pass filter, the response is more or less retarded than the speed response of FIG. 25 by the influence of the filter, since acceleration or deceleration becomes smooth, there is achieved an effect of making the torque (thrust) applied to the machine soft.

Figure 23:
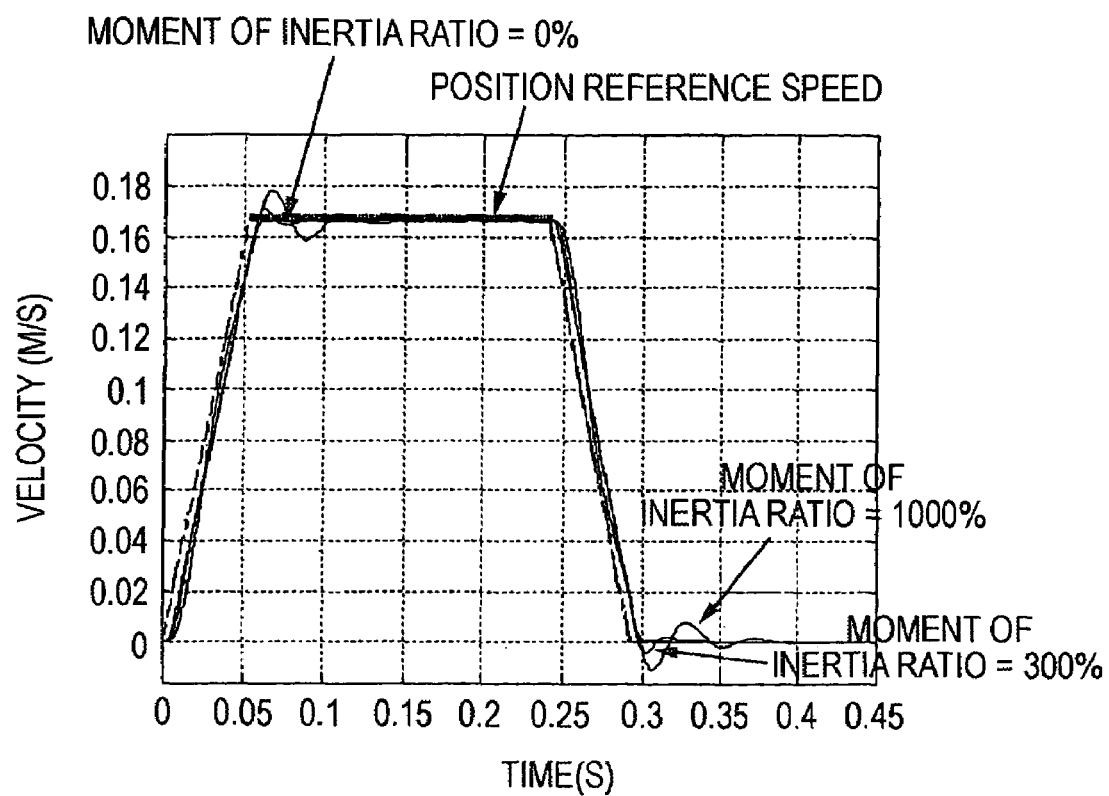
FIG. 23 is a graph showing a response of a position control system applied with speed FF and torque FF according to a third conventional art.

When compared with the result of the third conventional art of FIG. 23, the response is stabilized even when the moment of inertia ratio becomes 10 times. Further, although a vibration is brought about in a waveform immediately after the motor speed is changed from an accelerated speed to an equal speed or immediately after the motor speed is changed from a decelerated speed to a zero speed in the case of 15 times of the moment of inertia ratio, the vibration is smaller than that of the third conventional art.

That is, whereas according to the third conventional art, as shown by FIG. 23, when speed FF and torque FF are applied, the robust range regardless of the variation in the moment of inertia is deteriorated from 10 times to about 3 times, according to the tenth embodiment of the invention, the robust range can be ensured up to 10 times. Further, as is apparent by comparing with the speed response of the third embodiment of FIG. 12, the response is accelerated by speed FF and torque FF. Therefore, the problem of making ensuring the robust range and high speed formation of the response compatible which cannot be achieved by the conventional arts can be resolved by the tenth embodiment of the invention.

Embodiment 11

Although the ninth and the tenth embodiments of the invention show the constitutions of applying speed FF and torque FF to the constitution of the third embodiment, naturally, feed forward may be applied to the first embodiment.

An explanation will be given of a constitution of applying speed FF from the position reference in the constitution of FIG. 1 although not illustrated, as an eleventh embodiment of the invention. The position reference is inputted to the speed FF portion 1D, and the output of the speed FF portion 1D is added with the output of the position control portion 15 to be inputted to the phase compensating portion 14. The speed FF portion 1D is normally constituted by using a differentiator or an approximate differentiator.

Further, although not illustrated, when time lag of the phase compensating portion 14 and a characteristic of feed forward are not matched in the constitution of FIG. 1, overshoot may be brought about in a waveform of a position deviation. In that case, the overshoot is removed from the waveform of the response of the position deviation by adding a filter in series with a differentiator or an approximate differentiator in the speed FF portion 1D and adjusting a speed FF gain and a parameter (time constant or the like) of the filter.

Embodiment 12

An explanation will be given of a constitution of applying speed FF and torque FF from the position reference in the constitution of FIG. 1, although not illustrated, as a twelfth embodiment of the invention. In order to apply speed FF from the position reference, the position reference is inputted to the reference filter portion 1F, the output of the reference filter portion 1F is inputted to the speed FF portion 1D, and the output of the speed FF portion 1D is added with the position control portion 15 to be inputted to the phase compensating portion 14 as the speed reference. Next, in order to apply torque FF, the output of the reference filter portion 1F is inputted to the torque FF portion 1E, and the output of the torque FF portion 1E is added with the output of the speed control portion 16 to be inputted to the adder 103 as the torque (thrust) reference. According to the embodiment, with an object of making feed forward signals constituting outputs of the speed FF portion 1D and the torque FF portion 1E smooth, the position reference is inputted to the reference filter portion 1F. The reference filter portion may be constituted by, for example, exponential acceleration or deceleration constituting a first element low pass filter or a second element filter (for example, low pass filter) or a moving average filter or the like. Further, when the position reference is smooth, the reference filter portion can be omitted and the position reference is directly inputted to the speed FF portion 1D and the torque FF portion 1E.

Further, the speed FF portion 1D is constituted normally by using a differentiator or an approximate differentiator. Further, the torque FF portion 1E is constituted by normally using two stages of differentiators or two stages of approximate differentiators in series. Or, the output of the speed FF portion 1D may be inputted to the torque FF portion 1E. In this case, the torque FF portion 1E is constituted by a single stage of a differentiator or an approximate differentiator. Further, when time lag of the phase compensating portion 14 and a characteristic of feed forward are not matched overshoot may be brought about in a waveform of a position deviation. In that case, the overshoot is removed from the waveform of the response of the position deviation by adding a filter in series with a differentiator or an approximate differentiator at inside of the speed FF portion 1D or the torque FF portion 1E and adjusting a parameter (time constant or the like) of the filter.

Embodiment 13

Although according to the ninth and the tenth embodiments of the invention, there are shown the constitutions of applying speed FF or torque FF to the constitution of the third embodiment, naturally, feed forward may be applied to the second embodiment. An explanation will be given of a constitution of applying speed FF from the position reference in the constitution of FIG. 8, although not illustrated, as a thirteenth embodiment of the invention. The position reference is inputted to the speed FF portion 1D, and the output of the speed FF portion 1D is added with the output of the position control portion 15 to be inputted to the subtractor 104 as the speed reference.

The speed FF portion 1D is constituted by normally using a differentiator or an approximate differentiator.

Further, although not illustrated, when a phase advancing effect by the phase compensating portion 61 and a characteristic of feed forward are not matched since speed FF is applied from the position reference in the constitution of FIG. 8, overshoot may be brought about in a waveform of a position deviation. In that case, overshoot is removed from the waveform of the response of the position deviation by adding a filter in series with a differentiator or an approximate differentiator in the speed FF portion 1D and adjusting a speed FF gain and a parameter (time constant or the like) of the filter.

Embodiment 14

An explanation will be given of a constitution of applying speed FF and torque FF from the position reference in the constitution of FIG. 8, although not illustrated, as a twelfth embodiment of the invention. In order to apply the speed FF from the position reference, the position reference is inputted to the reference filter portion 1F, the output of the reference filter portion 1F is inputted to the speed FF portion 1D, the output of the speed FF portion is added with the output of the position control portion 15 to be inputted to the subtractor 104 as the speed reference. Next, in order to apply torque FF, the output of the reference filter portion 1F is inputted to the torque FF portion 1E and the output of the torque FF portion 1E is added with the output of the speed control portion 16 to be inputted to the adder 103 and the phase compensating portion 61 as the torque (thrust) reference. According to the embodiment, with an object of making feed forward signals constituting outputs of the speed FF portion 1D and the torque FF portion 1E smooth, the position reference is inputted to the reference filter portion 1F. The reference filter portion 1F may be constituted by, for example, exponential acceleration or deceleration constituting a first element low pass filter or a second element filter (for example, low pass filter) or a moving average filter or the like. Further, when the position reference is smooth, the reference filter portion 1F can be omitted, and the position reference is directly inputted to the speed FF portion 1D and the torque FF portion 1E.

The speed FF portion 1D is constituted by normally using a differentiator or an approximate differentiator. Further, the torque FF portion is constituted by normally using two stages of differentiators or two stages of approximate differentiators in series. Or, the output of the speed FF portion 1D may be inputted to the torque FF portion 1E. In this case, the torque FF portion 1E is constituted by a single stage of a differentiator or an approximate differentiator.

Further, even in a case of applying speed feed forward to the position control systems according to Embodiment 9 through Embodiment 14 of the invention, or a case of applying speed feed forward and torque feed forward, similar to the fourth embodiment, when the speed loop gain (not illustrated) in the speed control portion 16 is changed, the time constant of the low pass filter 64 of the speed observer can be changed by the function of Equation (4) or Equation (5), the value of compensating for the phase can automatically be readjusted. Further, similar to the sixth embodiment, when the speed loop gain (not illustrated) in the speed control portion 16 is changed, the cut off frequency of the low pass filter 51 of the phase advancing filter can be changed by the function of Equation (6) or Equation (7) and the value of compensating for the phase can automatically be readjusted.

INDUSTRIAL APPLICABILITY

The invention is constructed by the constitution of compensating for the deviation in setting the moment of inertia (inertia mass) ratio by the inertia variation restraining portion and the phase compensating portion and therefore, the motor can normally be driven without setting the moment of inertia (inertia mass) ratio and is applicable to a control apparatus of the motor (linear motor) used for a use of automatically compensating for a variation for a machine the moment of inertia (inertia mass) ratio of which is varied.

The invention claimed is:

1. A motor control apparatus comprising:
    a position detecting portion for detecting a position of a motor for driving a mechanism a moment of inertia or an inertia mass of which is unknown,
    a speed calculating portion for outputting a speed of the motor by inputting an output of the position detecting portion,
    a position control portion for outputting a speed reference by inputting a difference between a position reference and the position of the motor,
    an inertia variation restraining portion for outputting a new torque reference by predicting a disturbance of the motor by inputting a torque reference and the speed of the motor,
    a torque control portion for controlling a torque of the motor by inputting the new torque reference,
    a phase compensating portion for outputting a new speed reference of advancing a phase by inputting the speed reference, and
    a speed control portion for outputting the torque reference by inputting a difference between the new speed reference and the speed of the motor.

2. The motor control apparatus according to claim 1, further comprising:
    a phase compensating portion for outputting a new speed of advancing the phase by inputting the speed of the motor and the torque reference in place of the phase compensating portion, and
    a speed control portion for outputting the torque reference by inputting a difference between the speed reference and the new speed in place of the speed control portion.

3. The motor control apparatus according to claim 2, wherein
    the phase compensating portion comprises a low pass filter and calculates a time constant of the low pass filter by a polynomial constituting an independent variable by a speed loop gain.

4. The motor control apparatus according to claim 1, further comprising:
    a first phase compensating portion for outputting a new speed reference of advancing the phase by inputting the speed reference in place of the phase compensating portion,
    a second phase compensating portion for outputting a new speed advancing the phase by inputting the speed of the motor and the torque reference, and
    a speed control portion for outputting the torque reference by inputting a difference between the new speed reference and the new speed in place of the speed control portion.

5. The motor control apparatus according to claim 4, wherein
    the second phase compensating portion comprises a low pass filter and calculates a time constant of the low pass filter by a polynomial constituting an independent variable by a speed loop gain.

6. The motor control apparatus according to claim 4, wherein
    the first phase compensating portion comprises a low pass filter and calculates a cut off frequency of the low pass filter by a polynomial constituting an independent variable by a speed loop gain.

7. The motor control apparatus according to claim 1, wherein
    the phase compensating portion comprises a low pass filter and calculates a cut off frequency of the low pass filter by a polynomial constituting an independent variable by a speed loop gain.

8. A motor control apparatus comprising:
    a position detecting portion for detecting a position of a motor for driving a mechanism a moment of inertia or an inertia mass of which is unknown,
    a speed calculating portion for outputting a speed of the motor by inputting an output of the position detecting portion,
    an inertia variation restraining portion for outputting a new torque reference by predicting a disturbance of the motor by inputting a torque reference and the speed of the motor,
    a torque control portion for controlling a torque of the motor by inputting the new torque reference,
    a phase compensating portion for outputting a new speed advancing a phase by inputting the speed of the motor and the torque reference, and
    a speed control portion for inputting the torque reference by inputting a difference between a speed reference and the new speed.

9. The motor control apparatus according to claim 8, wherein
    the phase compensating portion comprises a low pass filter and calculates a time constant of the low pass filter by a polynomial constituting an independent variable by a speed loop gain.

10. A motor control apparatus comprising:
    a position detecting portion for detecting a position of a motor for driving a mechanism a moment of inertia or an inertia mass of which is unknown, a speed calculating portion for outputting a speed of the motor by inputting an output of the position detecting portion, a position control portion for outputting a speed reference by inputting a difference between a position reference and the position of the motor, a speed feed forward portion for outputting a speed feed forward signal by inputting the position reference, an inertia variation restraining portion for outputting a new torque reference by predicting a disturbance of the motor by inputting a torque reference and the speed of the motor, a torque control portion for controlling a torque of the motor by inputting the new torque reference, a phase compensating portion for outputting a new speed reference advancing a phase by inputting a sum of the speed reference and the speed feed forward signal, and a speed control portion for outputting the torque reference by inputting a difference between the new speed reference and the speed of the motor.

11. The motor control apparatus according to claim 10, further comprising:

a phase compensating portion for outputting a new speed advancing the phase by inputting the speed of the motor and the torque reference in place of the phase compensating portion, and a speed control portion for outputting the torque reference by inputting a difference between the sum of the speed reference and the speed feed forward signal and the new speed in place of the speed control portion.

12. The motor control apparatus according to claim 11, wherein the phase compensating portion comprises a low pass filter and calculates a time constant of the low pass filter by a polynomial constituting an independent variable by a speed loop gain.

13. The motor control apparatus according to claim 10, further comprising:

a first phase compensating portion for outputting the new speed reference advancing the phase by inputting the sum of the speed signal and the speed feed forward signal in place of the phase compensating portion, a second phase compensating portion for outputting the new speed advancing the phase by inputting the speed of the motor and the torque reference, and a speed control portion for outputting the torque reference by inputting a difference between the new speed reference and the new speed in place of the speed control portion.

14. The motor control apparatus according to claim 13, wherein the first phase compensating portion comprises a low pass filter and calculates a cut off frequency of the low pass filter by a polynomial constituting an independent variable by a speed loop gain.

15. The motor control apparatus according to claim 13, wherein the second phase compensating portion includes a low pass filter and calculates a time constant of the low pass filter by a polynomial constituting an independent variable by a speed loop gain.

16. The motor control apparatus according to claim 10, wherein the phase compensating portion comprises a low pass filter and calculates a cut off frequency of the low pass filter by a polynomial constituting an independent variable by a speed loop gain.

17. A motor control apparatus comprising:

a position detecting portion for detecting a position of a motor for driving a mechanism a moment of inertia or an inertia mass of which is unknown, a speed calculating portion for outputting a speed of the motor by inputting an output of the position detecting portion, a position control portion for outputting a speed reference by inputting a difference between a position reference and the position of the motor, a speed feed forward portion for outputting a speed forward signal by inputting the position reference, a torque feed forward portion for outputting a torque feed forward signal by inputting the position reference, an inertia variation restraining portion for outputting a new torque reference by predicting a disturbance of the motor by inputting a sum of a torque reference and the torque feed forward signal and the speed of the motor, a torque control portion for controlling a torque of the motor by inputting a new torque reference, a phase compensating portion for outputting a new speed reference advancing a phase by inputting a sum of the speed reference and the speed forward signal, and a speed control portion for outputting the torque reference by inputting a difference between the new speed reference and the speed of the motor.

18. The motor control apparatus according to claim 17, further comprising:

a phase compensating portion for outputting a new speed advancing the phase by inputting a sum of the torque reference and the torque feed forward signal and the speed of the motor in place of the phase compensating portion, and a speed control portion for outputting the torque reference by inputting a difference between a sum of the speed reference and the feed forward signal and the new speed in place of the speed control portion.

19. The motor control apparatus according to claim 18, wherein the phase compensating portion comprises a low pass filter and calculates a time constant of the low pass filter by a polynomial constituting an independent variable by a speed loop gain.

20. The motor control apparatus according to claim 17, further comprising:

a first phase compensating portion for outputting the new speed reference advancing the phase by inputting the sum of the speed reference and the speed feed forward signal in place of the phase compensating portion, a second phase compensating portion for outputting a new speed advancing the phase by inputting a sum of the torque reference and the torque feed forward signal and the speed of the motor, and a speed control portion for outputting the torque reference by inputting a difference between the new speed reference and the new speed in place of the speed control portion.

21. The motor control apparatus according to claim 20, wherein the first phase compensating portion comprises a low pass filter and calculates a cut off frequency of the low pass filter by a polynomial constituting an independent variable by a speed loop gain.

22. The motor control apparatus according to claim 20, wherein the second phase compensating portion includes a low pass filter and calculates a time constant of the low pass filter by a polynomial constituting an independent variable by a speed loop gain.

23. The motor control apparatus according to claim 17, wherein the phase compensating portion comprises a low pass filter and calculates a cut off frequency of the low pass filter by a polynomial constituting an independent variable by a speed loop gain.

* * * * *